(12) United States Patent
Liu et al.

(10) Patent No.: US 11,413,607 B2
(45) Date of Patent: Aug. 16, 2022

(54) DIESEL OXIDATION CATALYSTS FOR ULTRALOW $NO_x$ CONTROL

(71) Applicant: BASF Corporation, Florham Park, NJ (US)

(72) Inventors: Jia Cheng Liu, Shanghai (CN); Evan Vincent Miu, Iselin, NJ (US); Xiaoming Xu, Iselin, NJ (US); Xinyi Wei, Iselin, NJ (US); Stefan Maurer, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/250,103

(22) PCT Filed: May 29, 2019

(86) PCT No.: PCT/IB2019/054454
§ 371 (c)(1),
(2) Date: Nov. 25, 2020

(87) PCT Pub. No.: WO2019/229675
PCT Pub. Date: Dec. 5, 2019

(65) Prior Publication Data
US 2021/0213434 A1 Jul. 15, 2021

Related U.S. Application Data

(60) Provisional application No. 62/677,234, filed on May 29, 2018.

(51) Int. Cl.

| | | |
|---|---|---|
| *B01D 53/94* | (2006.01) | |
| *B01J 29/67* | (2006.01) | |
| *B01J 29/74* | (2006.01) | |
| *B01J 35/00* | (2006.01) | |
| *B01J 35/02* | (2006.01) | |
| *B01J 35/04* | (2006.01) | |
| *B01J 35/10* | (2006.01) | |
| *B01J 37/00* | (2006.01) | |
| *B01J 37/03* | (2006.01) | |
| *F01N 3/28* | (2006.01) | |

(52) U.S. Cl.
CPC ........ *B01J 29/7415* (2013.01); *B01D 53/944* (2013.01); *B01D 53/9413* (2013.01); *B01J 29/67* (2013.01); *B01J 29/743* (2013.01); *B01J 35/0006* (2013.01); *B01J 35/023* (2013.01); *B01J 35/04* (2013.01); *B01J 35/1052* (2013.01); *B01J 37/0045* (2013.01); *B01J 37/038* (2013.01); *F01N 3/2803* (2013.01); *B01D 2255/1023* (2013.01); *B01D 2255/50* (2013.01); *B01D 2255/502* (2013.01); *B01D 2255/904* (2013.01); *B01D 2255/9022* (2013.01); *B01D 2255/9025* (2013.01); *B01D 2255/9032* (2013.01); *B01D 2255/9155* (2013.01); *B01D 2255/9202* (2013.01); *F01N 2370/04* (2013.01)

(58) Field of Classification Search
CPC ............ B01D 53/9422; B01D 2252/50; B01D 2252/504; B01D 2253/108; B01D 2255/1023; B01D 2255/50; B01D 2255/91; B01D 2257/404; B01D 2258/012; B01J 20/0225; B01J 20/18; B01J 23/44; B01J 2029/062; B01J 29/068; F01N 3/0814; F01N 3/0842; F01N 2240/18; F01N 2250/12; F01N 2570/14

See application file for complete search history.

(56) References Cited

U.S. PATENT DOCUMENTS

| | | | |
|---|---|---|---|
| 2013/0136677 A1 | 5/2013 | Chandler et al. | |
| 2013/0149222 A1 | 6/2013 | Blakeman et al. | |
| 2015/0157982 A1 | 6/2015 | Rajaram et al. | |
| 2017/0096923 A1* | 4/2017 | Chiffey | ............... B01J 37/0244 |
| 2017/0209857 A1* | 7/2017 | Chandler | ............... B01J 29/763 |
| 2019/0299161 A1* | 10/2019 | Collier | ............... B01D 53/9481 |

FOREIGN PATENT DOCUMENTS

| | | | | |
|---|---|---|---|---|
| DE | 10 2007 005 703 A1 | 4/2008 | | |
| EP | 1 640 434 A1 | 3/2006 | | |
| JP | 2011 125 851 A | * 6/2011 | ............. | B01J 35/04 |
| JP | 2011-125851 A | 6/2011 | | |
| JP | 2016 175 076 A | * 10/2016 | ............ | B01J 29/072 |
| JP | 2016-175076 A | 10/2016 | | |

OTHER PUBLICATIONS

International Search Report dated Oct. 17, 2019 for International Application No. PCT/IB2019/054454.
European Search Report for EP Patent Application No. 19810603.1, dated Feb. 7, 2022, 6 pages.

* cited by examiner

*Primary Examiner* — Timothy C Vanoy
(74) *Attorney, Agent, or Firm* — Finnegan, Henderson, Farabow, Garrett & Dunner LLP

(57) ABSTRACT

The present disclosure is directed to a Low Temperature NOx-Absorber (LT-NA) catalyst composition which exhibits NOx adsorption in a broad temperature and space velocity range, and shifts NOx desorption to a desired temperature range. In particular, the LT-NA composition includes a large pore zeolite containing a palladium component and a small or medium pore zeolite containing a palladium component. Further provided is a catalyst article including the LT-NA catalyst composition, an emission treatment system for treating an exhaust gas including the catalyst article, and methods for reducing a NOx level in an exhaust gas stream using the catalyst article.

18 Claims, 18 Drawing Sheets

Fig. 1A
Fig. 1B
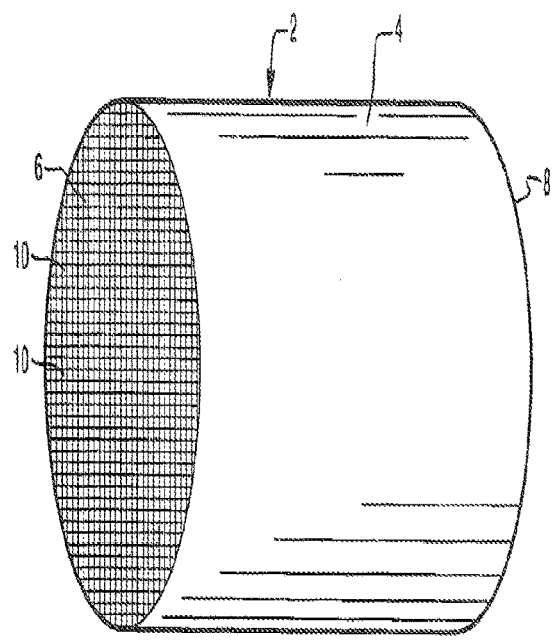
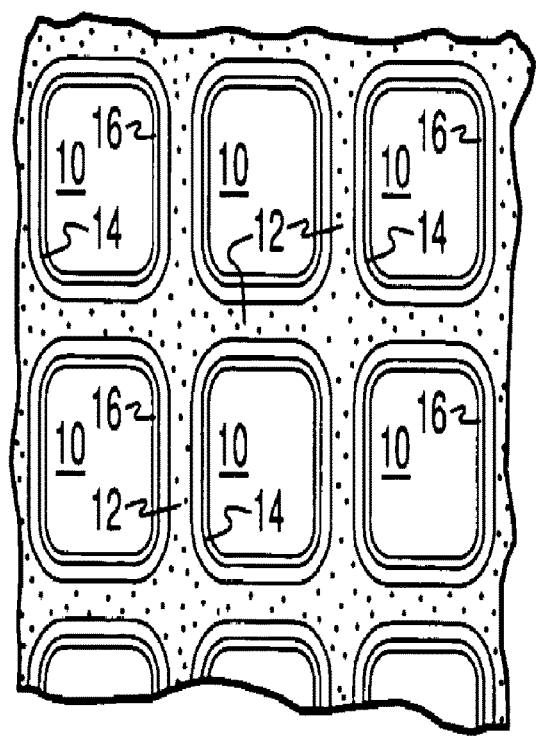

US 11,413,607 B2

DIESEL OXIDATION CATALYSTS FOR ULTRALOW $NO_x$ CONTROL

This application is a United States national stage entry application filed under 35 U.S.C. § 371 based on International Patent Application No. PCT/IB62019/054454, filed on May 29, 2019, which claims the benefit of priority under 35 U.S.C. § 119(e) to U.S. Provisional Application No. 62/677,234 filed May 29, 2018; each of which is incorporated herein by reference in their entirety.

FIELD OF THE INVENTION

The present invention is directed to catalytic compositions, articles, system, and methods suitable for treating exhaust gas streams of an internal combustion engine to reduce emissions of nitrogen oxides ($NO_x$).

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as one or more platinum group metals (PGMs), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel engines to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain one or more PGMs promote the oxidation of NO to $NO_2$. Catalysts are typically defined by their light-off temperature or the temperature at which 50% conversion is attained, also called $T_{50}$.

$NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr or Ba. Other lean LNT systems can contain rare earth metal oxides such as oxides of Ce, La, Pr or Nd. The $NO_x$ sorbents can be used in combination with PGM catalysts such as platinum components dispersed on a refractory metal oxide (e.g., alumina) support for catalytic $NO_x$ oxidation and reduction. The LNT catalyst operates under cyclic lean (trapping mode) and rich (regeneration mode) exhaust conditions during which the engine out NO is converted to $N_2$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst component. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \text{ (standard SCR reaction)}$$

$$2NO_2 + 4NH_3 \rightarrow 3N_2 + 6H_2O \text{ (slow SCR reaction)}$$

$$NO + NO_2 + NH_3 \rightarrow 2N_2 + 3H_2O \text{ (fast SCR reaction)}$$

Current catalysts employed in the SCR process include molecular sieves, such as zeolites, ion-exchanged with a catalytic metal such as iron or copper. A useful SCR catalyst component is able to effectively catalyze the reduction of the $NO_x$ exhaust component at temperatures below 600° C. so that reduced $NO_x$ levels can be achieved even under conditions of low load, which typically are associated with lower exhaust temperatures.

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides ($NO_x$) and/or carbon monoxide (CO) emissions. In general, catalytic components such as SCR catalyst components are very effective in converting $NO_x$ to $N_2$ at temperatures above 200° C. but do not exhibit sufficient activities at lower temperature regions (<200° C.) such as those found during cold-start or prolonged low-speed city driving. Therefore, catalytic components capable of capturing and storing such low-temperature $NO_x$ emissions, and being able to release it at higher temperatures (>200° C.) when catalytic components (i.e. SCR catalyst components) become effective are in great demand. As a result, considerable efforts have been made to alleviate this problem. For instance, new trapping systems have been developed, which can store these exhaust gas emissions at low temperatures and subsequently release them (i.e., HC, CO and $NO_x$ gases) at higher temperatures, when the remaining catalytic components of the treatment system have attained sufficient catalytic activity.

For example, zeolites are often used as adsorbent materials in catalytic treatment systems in order to adsorb and retain gaseous hydrocarbon pollutants during the initial cold-start period. As the exhaust gas temperature increases, the adsorbed hydrocarbons are driven from the adsorbent material and subjected to catalytic oxidation at higher temperatures. However, the $NO_x$-adsorber technology has been limited to use in LNT applications where $NO_x$ (NO and $NO_2$) is adsorbed on base metal oxides (BaO, MgO, $CeO_2$, etc) under lean conditions and then released and reduced under transient rich conditions. The NO to $NO_2$ conversion is a prerequisite to efficient $NO_x$ trapping; however the reaction rate is very slow when temperature is below 200° C., which renders traditional LNT catalyst unsuitable for trapping of cold-start $NO_x$ emission.

Due to emission regulations becoming increasingly more stringent, it would be highly desirable to provide an improved $NO_x$ storage component to capture cold-start $NO_x$ emission. As >80% of cold-start $NO_x$ emission consists of NO, it is imperative that advanced $NO_x$ adsorption materials have great efficiency for NO adsorption.

SUMMARY OF THE INVENTION

The present disclosure generally provides catalyst compositions, catalyst articles and catalyst systems comprising such catalyst articles which exhibit enhanced $NO_x$ adsorption under low temperature conditions. In particular, such articles and systems comprise a $NO_x$ adsorber suitable for adsorbing $NO_x$ at low temperatures and releasing trapped $NO_x$ at elevated temperatures. The $NO_x$ adsorption component of the present catalyst compositions provide desirable $NO_x$ adsorption and desorption properties under various engine operating conditions.

Accordingly, in one aspect is provided a Low-Temperature $NO_x$ Adsorber (LT-NA) catalyst composition comprising a first zeolite, wherein the first zeolite is a large pore zeolite and comprises a first palladium component; and a second zeolite, wherein the second zeolite is a small pore or medium pore zeolite and comprises a second palladium component.

In some embodiments, the first zeolite and the second zeolite is each an aluminosilicate zeolite. In some embodiments, the silica-to-alumina ratio (SAR) of the first zeolite is from about 10 to about 50. In some embodiments, the SAR of the second zeolite is from about 10 to about 50.

In some embodiments, the first zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, FZU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof. In some embodiments, the first zeolite is selected from the group consisting of BEA, FAU, and combinations thereof.

In some embodiments, the second zeolite is a small pore zeolite with a framework type selected from the group consisting of ACO, AEI, AEN, AFN, AFT, AFX, APC, APD, ATT, CDO, CHA, DDR, DFT, EAB, EDI, EPI, ERI, GIS, GOO, IHW, ITE, ITW, LEV, KFI, MER, MFI, MON, NSI, OWE, PAU, PHI, RHO, RTH, SAT, SAV, SIV, THO, TSC, UEI, UFI, VNI, YUG, ZON, and mixtures or intergrowths thereof. In some embodiments, the second zeolite is a small pore zeolite with a framework type selected from the group consisting of CHA, LEV, AEI, AFX, ERI, SFW, KFI, DDR, LIE, and mixtures or intergrowths thereof. In some embodiments, the second zeolite is a medium pore zeolite with a framework type selected from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. In some embodiments, the second zeolite has a two-dimensional pore system.

In some embodiments, the second zeolite is a medium pore zeolite with a framework type selected from FER, MEL, WTI, STT, and mixtures or intergrowths thereof. In some embodiments, the second zeolite is selected from the group consisting of FER, MWW, CHA, and combinations thereof. In some embodiments, the first zeolite is BEA and the second zeolite is FER.

In some embodiments, the catalyst composition further comprises a third zeolite comprising a third palladium component. In some embodiments, the third zeolite is a large pore zeolite and wherein the first zeolite and the third zeolite have different framework types. In some embodiments, the third zeolite is a small pore or medium pore zeolite and wherein the second zeolite and the third zeolite have different framework types.

In some embodiments, the first palladium component and the second palladium component are present in an amount of about 0.5% to about 6% by weight, or about 1% to about 3% by weight, based on the first zeolite and the second zeolite, respectively. In some embodiments, the ratio by weight of the first zeolite to the second zeolite is from about 1:9 to about 9:1. In some embodiments, the ratio by weight of the first zeolite to the second zeolite is from about 1:3 to about 3:1, for example, the ratio may be about 1:3, about 1:2.5, about 1:2, about 1:1.5, about 1:1, about 3:1, about 2.5:1, about 2:1, about 1.5:1 or about 1:1. In some embodiments, the ratio by weight of the first zeolite to the second zeolite is from about 0.1:9.9 to about 9:1. In some embodiments, the ratio by weight of the first zeolite to the second zeolite is from about 0.1:9.9 to about 0.5:9.5.

In another aspect is provided a catalyst article for treating an exhaust stream of an internal combustion engine, the article comprising a catalyst substrate having an inlet end and an outlet end defining an overall length, and a first LT-NA catalyst composition, wherein the first LT-NA catalyst composition is the LT-NA catalyst composition disclosed herein. In some embodiments, the first LT-NA catalyst composition is in the form of a mixture comprising the first zeolite and the second zeolite. In some embodiments, the catalyst article comprises a first washcoat comprising the first zeolite disposed on at least a portion of the length of the catalyst substrate, and a second washcoat comprising the second zeolite disposed on at least a portion of the length of the catalyst substrate. In some embodiments, the second washcoat is directly on the catalyst substrate and the first washcoat is on at least a portion of the second washcoat. In some embodiments, the first washcoat is directly on the catalyst substrate, and the second washcoat is on at least a portion of the first washcoat. In some embodiments, the catalyst article has a zoned configuration such that the first washcoat is disposed on the catalyst substrate from the inlet end to a length from about 10% to about 70% of the overall length, and the second washcoat is disposed on the catalyst substrate from the outlet end to a length from about 30% to about 90% of the overall length.

In some embodiments, the catalyst article comprises a Pd loading from about 15 g/ft$^3$ to about 100 g/ft$^3$ or from about 60 g/ft$^3$ to about 90 g/ft$^3$. In some embodiments, the catalyst article comprises a total zeolite loading of from about 1 g/in$^3$ to about 5 g/in$^3$ or from about 2 g/in$^3$ to about 4 g/in$^3$. In some embodiments, the catalyst article comprises a silica-to-alumina ratio (SAR) of from about 5 to about 50 or from about 10 to about 35. In some embodiments, the catalyst substrate comprises a honeycomb substrate in the form of a wall flow filter or a flow through substrate. In some embodiments, the catalyst article further comprises a first diesel oxidation catalyst (DOC) composition disposed on the substrate. In some embodiments, the first DOC composition comprises a Pt component and a fourth Pd component, wherein the Pt component and the fourth Pd component are supported on refractory metal oxide support materials. In some embodiments, the refractory metal oxide comprises gamma alumina or alumina doped with about 2% to about 10% $SiO_2$. In some embodiments, the first DOC composition further comprises beta zeolite which is substantially free of any platinum-group metal (PGM) species.

In some embodiments, the first LT-NA catalyst composition and the first DOC composition are present on the catalyst substrate in a homogenous single layer. In some embodiments, the first LT-NA catalyst composition comprises a first layer and the DOC composition comprises a second layer. In some embodiments, the first layer is disposed on at least a portion of the length of the catalyst substrate and the second layer is disposed on at least a portion of the length of the catalyst substrate. In some embodiments, the first layer is directly on the catalyst substrate and the second layer is on at least a portion of the first layer. In some embodiments, the second layer is directly on the catalyst substrate and the first layer is on at least a portion of the second layer. In some embodiments, the catalyst article has a zoned configuration such that the second layer is disposed on the catalyst substrate from the inlet end to a length from about 10% to about 70% of the overall length, and the first layer is disposed on the catalyst substrate from the outlet end to a length from about 30% to about 90% of the overall length.

In some embodiments, the catalyst article further comprises a third layer. In some embodiments, the third layer comprises a second DOC composition. In some embodiments, the first layer is disposed between the second layer and the third layer. In some embodiments, the second DOC composition is identical to the first DOC composition.

In some embodiments, the third layer comprises a second LT-NA catalyst composition. In some embodiments, the second layer is disposed between the first layer and the third layer. In some embodiments, the second LT-NA catalyst composition is identical to the first LT-NA catalyst composition.

In some embodiments is provided a catalytic article having a first DOC composition directly on the substrate, a first LT-NA catalyst composition on the first DOC composition, and a second DOC composition on the first LT-NA composition. In some embodiments is provided a catalytic article having a second DOC composition directly on the substrate, a first LT-NA catalyst composition on the second DOC composition, and a first DOC composition on the first LT-NA composition.

In some embodiments is provided a catalytic article having a first LT-NA catalyst composition directly on the substrate, a first DOC catalyst composition on the first LT-NA catalyst composition, and a second LT-NA catalyst composition on the first DOC composition. In some embodiments is provided a catalytic article having a second LT-NA catalyst composition directly on the substrate, a first DOC composition on the second LT-NA catalyst composition, and a first LT-NA catalyst composition on the first DOC composition.

In yet another aspect is provided an exhaust gas treatment system comprising the catalytic article disclosed herein, wherein the catalytic article is downstream of and in fluid communication with an internal combustion engine.

In a still further aspect is provided a method for reducing a $NO_x$ level in an exhaust gas stream from an internal combustion engine, the method comprising passing the exhaust stream through any of the catalyst compositions, catalytic articles, or exhaust gas treatment systems disclosed herein.

The present disclosure includes, without limitation, the following embodiments.

Embodiment 1: A Low-Temperature $NO_x$ Adsorber (LT-NA) catalyst composition comprising a first zeolite, wherein the first zeolite is a large pore zeolite and comprises a first palladium component; and a second zeolite, wherein the second zeolite is a small pore or medium pore zeolite and comprises a second palladium component.

Embodiment 2: The LT-NA catalyst composition of any preceding embodiment, wherein the first zeolite and the second zeolite are each an aluminosilicate zeolite.

Embodiment 3: The LT-NA catalyst composition of any preceding embodiment, wherein the silica-to-alumina ratio (SAR) of the first zeolite is from about 10 to about 50.

Embodiment 4: The LT-NA catalyst composition of any preceding embodiment, wherein the SAR of the second, zeolite is from about 10 to about 50.

Embodiment 5: The LT-NA catalyst composition of any preceding embodiment, wherein the first zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, FZU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

Embodiment 6: The LT-NA catalyst composition of any preceding embodiment, wherein the first zeolite is selected from the group consisting of BEA, FAU, and combinations thereof.

Embodiment 7: The LT-NA catalyst composition of any preceding or subsequent embodiment, wherein the second zeolite is a small pore zeolite with a framework type selected from the group consisting of ACO, AEI, AEN, AFN, AFT, AFX, APC, APD, ATT, CDO, CHA, DDR, DFT, EAB, EDI, EPI, ERI, GIS, GOO, IHW, ITE, ITW, LEV, KFI, MER, MFI, MON, NSI, OWE, PAU, PHI, RHO, RTH, SAT, SAV, SIV, THO, TSC, UEI, UFI, VNI, YUG, ZON, and mixtures or intergrowths thereof.

Embodiment 8: The LT-NA catalyst composition of any preceding embodiment, wherein the second zeolite is a small pore zeolite with a framework type selected from the group consisting of CHA, LEV, AEI, AFX, ERI, SFW, KFI, DDR, ITE, and mixtures or intergrowths thereof.

Embodiment 9: The LT-NA catalyst composition of any preceding embodiment, wherein the second zeolite is a medium pore zeolite with a framework type selected from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof.

Embodiment 10: The LT-NA catalyst composition of any preceding embodiment, wherein the second zeolite has a two-dimensional pore system.

Embodiment 11: The LT-NA catalyst composition of any preceding embodiment, wherein the second zeolite has a two-dimensional pore system and has a framework type selected from FER, CSV, DAC, HEU, MFS, MWW, NES, RRO, SFG, STI, STT, and TER.

Embodiment 12: The LT-NA catalyst composition of any preceding embodiment, wherein the second zeolite is a medium pore zeolite with a framework type selected from FER, MEL, MFI, STT, and mixtures or intergrowths thereof.

Embodiment 13: The LT-NA catalyst composition of any preceding embodiment, wherein the second zeolite is selected from the group consisting of FER, MWW, CHA, and combinations thereof.

Embodiment 14: The LT-NA catalyst composition of any preceding embodiment, wherein the first zeolite is BEA and the second zeolite is FER.

Embodiment 15: The LT-NA catalyst composition of any preceding embodiment, further comprising a third zeolite comprising a third palladium component.

Embodiment 16: The LT-NA catalyst composition of any preceding embodiment, wherein the third zeolite is a large pore zeolite and wherein the first zeolite and the third zeolite have different framework types.

Embodiment 17: The LT-NA catalyst composition of any preceding embodiment, wherein the third zeolite is a small pore or medium pore zeolite and wherein the second zeolite and the third zeolite have different framework types.

Embodiment 18: The LT-NA catalyst composition of any preceding embodiment, wherein the first palladium component and the second palladium component are present in an amount of about 0.5% to about 64% by weight, or about 1% to about 2% by weight, based on the first zeolite and the second zeolite, respectively.

Embodiment 19: The LT-NA catalyst composition of any preceding embodiment, wherein the ratio by weight of the first zeolite to the second zeolite is from about 0.1:9.9 to about 9:1.

Embodiment 20: The LT-NA catalyst composition of any preceding embodiment, wherein the ratio by weight of the first zeolite to the second zeolite is from about 0.1:9.9 to about 0.5:9.5.

Embodiment 21: A catalyst article for treating an exhaust stream of an internal combustion engine comprising a catalyst substrate having an inlet end and an outlet end defining an overall length, and the LT-NA catalyst composition of any preceding or subsequent embodiment disposed thereon.

Embodiment 22: The catalyst article of any preceding embodiment, wherein the LT-NA catalyst composition is in the form of a mixture comprising the first zeolite and the second zeolite.

Embodiment 23: The catalyst article of any preceding embodiment, comprising a first washcoat comprising the first zeolite disposed on at least a portion of the length of the catalyst substrate, and a second washcoat comprising the second zeolite disposed on at least a portion of the length of the catalyst substrate.

Embodiment 24: The catalyst article of any preceding embodiment, wherein the second washcoat is directly on the catalyst substrate and the first washcoat is on at least a portion of the second washcoat.

Embodiment 25: The catalyst article of any preceding embodiment, wherein the first washcoat is directly on the catalyst substrate and the second washcoat is on at least a portion of the first washcoat.

Embodiment 26: The catalyst article of any preceding, wherein the catalyst article has a zoned configuration such that the first washcoat is disposed on the catalyst substrate from the inlet end to a length from about 10% to about 70% of the overall length, and the second washcoat is disposed on the catalyst substrate from the outlet end to a length from about 30 to about 90% of the overall length.

Embodiment 27: The catalyst article of any preceding embodiment, wherein the catalyst article comprises a Pd loading from about 15 $g/ft^3$ to about 200 $g/ft^3$ or from about 60 $g/ft^3$ to about 120 $g/ft^3$.

Embodiment 28: The catalyst article of any preceding embodiment, wherein the catalyst article comprises a total zeolite loading of from about 1 $g/in^3$ to about 5 $g/in^3$ or from about 2 $g/in^3$ to about 4 $g/in^3$.

Embodiment 29: The catalyst article of any preceding embodiment, wherein the catalyst article comprises a SAR of from about 5 to about 50 or about 10 to about 35.

Embodiment 30: The catalyst article of any preceding embodiment, wherein the catalyst substrate comprises a honeycomb substrate in the form of a wall flow filter or a flow through substrate.

Embodiment 31: The catalyst article of any preceding embodiment, further comprising a diesel oxidation catalyst (DOC) composition disposed on the substrate.

Embodiment 32: The catalyst article of any preceding embodiment, wherein the DOC composition comprises a Pt component and a fourth Pd component, wherein the Pt component and the fourth Pd component are supported on refractory metal oxide support materials.

Embodiment 33: The catalyst article of any preceding embodiment, wherein the refractory metal oxide comprises gamma alumina or alumina doped with about 2% to about 10% $SiO_2$.

Embodiment 34: The catalyst article of any preceding embodiment, wherein the DOC composition further comprises beta zeolite which is substantially free of any platinum-group metal (PGM) species.

Embodiment 35: The catalyst article of any preceding embodiment, wherein the LT-NA catalyst composition and the DOC composition are present on the catalyst substrate in a homogenous single layer.

Embodiment 36: The catalyst article of any preceding embodiment, wherein the LT-NA catalyst composition comprises a first layer and the DOC composition comprises a second layer.

Embodiment 37: The catalyst article of any preceding embodiment, wherein the first layer is disposed on at least a portion of the length of the catalyst substrate and the second zeolite is disposed on at least a portion of the length of the catalyst substrate.

Embodiment 38: The catalyst article of any preceding embodiment, wherein the first layer is directly on the catalyst substrate and the second layer is on at least a portion of the first layer.

Embodiment 39: The catalyst article of any preceding embodiment, wherein the second layer is directly on the catalyst substrate and the first layer is on at least a portion of the second layer.

Embodiment 40: The catalyst article of any preceding embodiment, wherein the catalyst article has a zoned configuration such that the second layer is disposed on the catalyst substrate from the inlet end to a length from about 10% to about 70% of the overall length, and the first layer is disposed on the catalyst substrate from the outlet end to a length from about 30 to about 90% of the overall length.

Embodiment 41: The catalyst article of any preceding embodiment, further comprising a third layer.

Embodiment 42: The catalyst article of any preceding embodiment, wherein the third layer comprises a second DOC composition.

Embodiment 43: The catalyst article of any preceding embodiment, wherein the first layer is disposed between the second layer and the third layer.

Embodiment 44: The catalyst article of any preceding embodiment, wherein the second DOC composition is identical to the first DOC composition.

Embodiment 45: The catalyst article of any preceding embodiment, wherein the third layer comprises a second LT-NA composition.

Embodiment 46: The catalyst article of any preceding embodiment, wherein the second layer is disposed between the first layer and the third layer.

Embodiment 47: The catalyst article of any preceding embodiment, wherein the second LT-NA composition is identical to the first LT-NA composition.

Embodiment 48: The catalyst article of any preceding embodiment, wherein the DOC composition further comprises a third layer, and wherein the first layer is disposed between the second layer and the third layer.

Embodiment 49: The catalyst article of any preceding embodiment, wherein the LT-NA composition further comprises a third layer, and wherein the second layer is disposed between the first layer and the third layer.

Embodiment 50: An exhaust gas treatment system comprising the catalytic article of any preceding embodiment, wherein the catalytic article is downstream of and in fluid communication with an internal combustion engine.

Embodiment 51: A method for reducing a $NO_x$ level in an exhaust gas stream from an internal combustion engine, the method comprising contacting the exhaust gas stream with the catalyst article of any preceding embodiments.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1A is a perspective view of a honeycomb-type substrate which may comprise a catalyst (i.e., Low-Temperature $NO_x$ adsorber (LT-NA)) washcoat composition in accordance with the present disclosure;

FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1, in an embodiment wherein the substrate is a flow-through substrate;

DETAILED DESCRIPTION OF THE INVENTION

Figure 2:
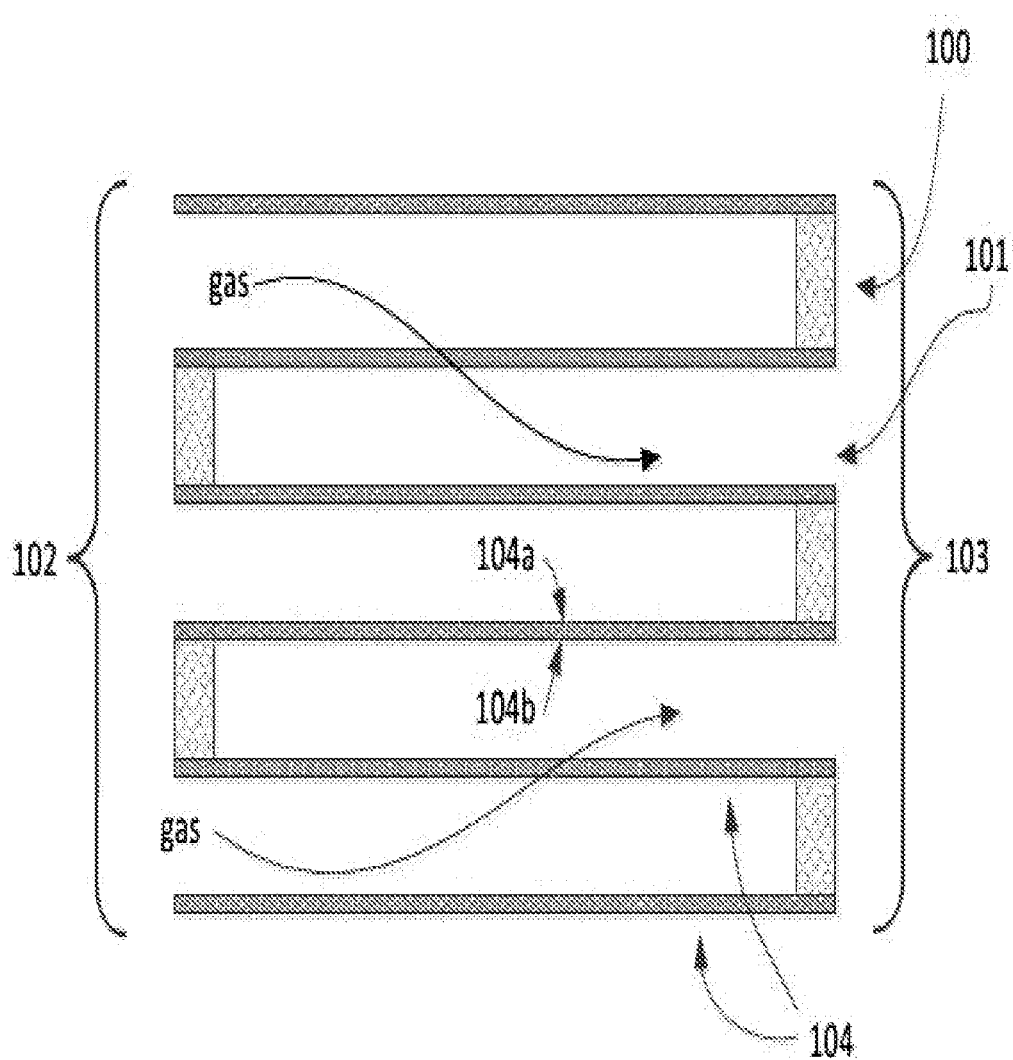
FIG. 2 is a cutaway view of a section enlarged relative to FIG. 1A, wherein the honeycomb-type substrate in FIG. 1A represents a wall-flow filter.

The present disclosure generally provides catalysts, catalyst articles and catalyst systems comprising such catalyst articles suitable for the adsorption and subsequent thermal release of $NO_x$. In particular, such articles and systems comprise a $NO_x$ adsorber suitable for adsorbing $NO_N$ at low temperatures (LT-NA) and thermally releasing trapped $NO_x$ at elevated temperatures. This is of particular importance, for example, when the LT-NA catalytic article is placed upstream of a selective catalytic reduction (SCR) catalyst component that is very effective in converting $NO_x$ to $N_2$ at temperatures above 200° C., but does not exhibit sufficient activity at lower temperature regions (<200° C.) such as during cold-start and before urea can be injected into the exhaust.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The term "abatement" means a decrease in the amount, caused by any means.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with D50, meaning half of the population of particles has a particle size above this point, and half below. Particle size refers to primary particles. Particle size may be measured by laser light scattering techniques, with dispersions or dry powders, for example according to ASTM method D4464. D90 particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for the support-containing particles (micron size).

The term "catalyst" refers to a material that promotes a chemical reaction. The catalyst includes the "catalytically active species" and the "support" that carries or supports the active species. For example, zeolites are supports for palladium active catalytic species. Likewise, refractory metal oxide particles may be a support for platinum group metal catalytic species. The catalytically active species are also termed "promoters" as they promote chemical reactions. For instance, a present palladium-containing zeolite may be termed a Pd-promoted zeolite. A "promoted zeolite" refers to a zeolite to which catalytically active species are intentionally added.

The term "catalytic article" in the invention means an article comprising a substrate having a catalyst coating composition.

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also coated directly onto a wall-flow filter, which is called SCRoF.

As used herein, the phrase "catalyst system" refers to a combination of two or more catalysts, for example, a combination of a first low-temperature $NO_x$ adsorber (LT-NA) catalyst and a second catalyst which may be a diesel oxidation catalyst (DOC), a LNT or a SCR catalyst article. The catalyst system may alternatively be in the form of a washcoat in which the two catalysts are mixed together or coated in separate layers The term "configured" as used in the description and claims is intended to be an open-ended term as are the terms "comprising" or "containing" The term "configured" is not meant to exclude other possible articles or elements. The term "configured" may be equivalent to "adapted".

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The term "functional article" in the invention means an article comprising a substrate having a functional coating composition disposed thereon, in particular a catalyst and/or sorbent coating composition.

As used herein, "impregnated" or "impregnation" refers to permeation of the catalytic material into the porous structure of the support material.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

As used herein, the term "molecular sieves," such as zeolites and other zeolitic framework materials (e.g. isomorphously substituted materials), refers to materials that may, in particulate form, support catalytic PGMs. Molecular sieves are materials based on an extensive three-dimensional network of oxygen ions containing generally tetrahedral type sites and having a substantially uniform pore distribution, with the average pore size being no larger than 20 Ångstroms (Å).

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

"Platinum group metal components" or "PGM components" refer to platinum group metals or one of their oxides As used herein, the term "promoted" refers to a component that is intentionally added to the molecular sieve material, typically through ion exchange, as opposed to impurities inherent in the molecular sieve.

As used herein, the term "selective catalytic reduction" (SCR) refers to the catalytic process of reducing oxides of nitrogen to dinitrogen ($N_2$) using a nitrogenous reductant.

As used herein, the terms "nitrogen oxides" or "$NO_x$" designate the oxides of nitrogen, such as NO, $NO_2$ or $N_2O$.

The term "sorbent" refers to a material that adsorbs and/or absorbs a desired substance, in this invention a $NO_x$ and/or CO and/or HC and/or $NH_3$. Sorbents may advantageously adsorb and/or absorb (store) a substance at a certain temperature and desorb (release) the substance at a higher temperature.

"Substantially free" means "little or no" or "no intentionally added" and also having only trace and/or inadvertent amounts. For instance, in certain embodiments, "substantially free" means less than 2 wt. % (weight %), less than 1.5 wt. %, less than 1.0 wt. %, less than 0.5 wt. %, 0.25 wt. % or less than 0.01 wt. %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Flow-through and wall-flow substrates are also taught, for example, in International Application Publication No. WO2016/070090, which is incorporated herein by reference. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet. A washcoat is formed by preparing a slurry containing a certain solid content (e.g., 20%-90% by weight) of particles in a liquid vehicle, which is then coated onto a substrate and dried to provide a washcoat layer.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. The washcoat containing the metal-promoted molecular sieve of the invention can optionally comprise a binder selected from silica, alumina, titanic, zirconia, ceria, or a combination thereof. The loading of the binder is about 0.1 to 10 wt. % based on the weight of the washcoat. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt. %)," if not otherwise indicated, is based on an entire composition free of any volatiles, that is, based on dry solids content. Unless otherwise indicated, all parts and percentages are by weight.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves.

A present zeolite, independently, may comprise $SiO_4$/$AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Zeolites can be differentiated mainly according to the geometry of the voids which are formed by the rigid network of the ($SiO_4$)/$AlO_4$ tetrahedra. The entrances to the voids are formed from 6, 8, 10, or 12 ring atoms with respect to the atoms which form the entrance opening.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms.

Typically, any framework type of zeolite can be used, such as framework types of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DON, EAB, EDI, EEI, EMT, EON, EPI, ERI, ESV, ETR, EUO, FAU, FER, GIS, GME, GON, GOO, HEU, IFR, IFY, IHW, IRN, ISV, ITE, ITH, ITW, IWR, IWW, JBW, KFI, LAU, LEV, LOV, LTA, LTL, LTN, MAZ, MEI, MEL, MER, MFI, MFS, MON, MOR, MOZ, MTF, MTT, MTW, MWF, MWW, NAB, NAT, NES, NPO, NPT, NSI, OBW, OFF, OSI, OSO, OWE, PAR, PAU, PHI, PON, RHO, RON, RRO, RSN, RTE, RTH, RWR, RWY, SAO, SAS, SAT, SAV, SBE, SBS, SBT, SFE, SFF, SFG, SFH, SFN, SFO, SFW, SOS, SSY, STF, STI, STT, TER, THO, TON, TSC, UEI, UFI, USI, UTL, VET, VFI, VNI, VSV, WIE, WEN, YUG, ZON, or combinations thereof.

For example, a present zeolite may comprise a framework type selected from the group consisting of AEI, BEA (beta zeolites), CHA (chabazite), FAU (zeolite Y), FER (ferrierite), MFI (ZSM-5) and MOR (mordenite). Non-limiting examples of zeolites having the AEI, BEA, CHA, FAU, FER, WI and MOR structures include chabazite, faujasite, zeolite Y, ultrastable zeolite Y, beta zeolite, mordenite, silicalite, zeolite X, and ZSM-5.

For example, a present zeolite can have the chabazite crystal structure, which is also referred to as the CHA structure by the International Zeolite Association. Zeolitic CHA-framework type molecular sieves include a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, each of which is incorporated by reference here in its entirety. A method of making yet another synthetic non-zeolitic molecular sieve having chabazite structure, SAPO-44, is described for instance in U.S. Pat. No. 6,162,415, which is incorporated by reference here in its entirety.

Zeolites are crystalline materials having rather uniform pore sizes which, depending upon the type of zeolite and the type and amount of cations included in the zeolite lattice, range from about 3 to 10 Ångstroms in diameter. The pore sizes are defined by the ring size. As used herein, the term "small pore" refers to pore openings which are smaller than about 5 Ångstroms, for example on the order of ~3.8 Ångstroms.

A small pore zeolite contains channels defined by up to eight tetrahedral atoms. The phrase "8-ring" zeolite refers to a zeolite having 8-ring pore openings and double-six ring secondary building units and having a cage like structure resulting from the connection of double six-ring building units by 4 rings.

Exemplary small pore zeolites include framework types ACO, AEI, AEN, AFN, AFT, AFX, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, Pre-Grant publications and patents referred to herein are hereby incorporated by reference in their entireties.

LT-NA Catalyst Composition

The present disclosure provides a Low-Temperature $NO_x$ Adsorber (LT-NA) catalyst composition comprising a first zeolite, wherein the first zeolite is a large pore zeolite and comprises a first palladium component; and a second zeolite, wherein the second zeolite is a small pore or medium pore zeolite and comprises a second palladium component. In some embodiments, the LT-NA catalyst composition further comprises a third zeolite comprising a third palladium component. The components of these LT-NA catalyst compositions are discussed herein below.

Zeolites

As referenced above, the present LT-NA catalyst composition comprises a first zeolite, a second zeolite, and optionally, a third zeolite. In some embodiments, the first zeolite is an aluminosilicate zeolite. The first zeolite is advantageously a large pore zeolite, as described herein. In some embodiments, the first zeolite is a large pore zeolite having a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, FZU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof. In some embodiments, the first zeolite is a large pore zeolite having a framework type selected from the group consisting of BEA, FAU, and combinations thereof.

In some embodiments, the second zeolite is an aluminosilicate zeolite. In some embodiments, the second zeolite is a small pore zeolite. For example, in some embodiments, the second zeolite is a small pore zeolite with a framework type selected from the group consisting of ACO, AEI, AEN, AFN, AFT, AFX, APC, APD, ATT, CDO, CHA, DDR, DFT, EAB, EDI, EPI, ERI, GIS, GOO, IHW, ITE, ITW, LEV, KFI, MER, MFI, MON, NSI, OWE, PAU, PHI, RHO, RTH, SAT, SAV, SIV, THO, TSC, UEI, UFI, VNI, YUG, ZON, and mixtures or intergrowths thereof. In some embodiments, the second zeolite is a small pore zeolite with a framework type selected from the group consisting of CHA, LEV, AEI, AFX, ERI, SFW, KFI, DDR, ITE, and mixtures or intergrowths thereof.

In some embodiments, the second zeolite is a medium pore zeolite. For example, in some embodiments, the second zeolite is a medium pore zeolite with a framework type selected from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. In some embodiments, the second zeolite is a medium pore zeolite with a framework type selected from FER, MEL, MFI, STT, and mixtures or intergrowths thereof. In some embodiments, the second zeolite is a medium pore zeolite selected from the group consisting of FER, MWW, CHA, and combinations thereof.

In some embodiments, the second zeolite has a two-dimensional pore system. In some embodiments, the second zeolite having the two-dimensional pore system may have a framework type such as, but not limited to, FER, CSV, DAC, HEU, MFS, MWW, NES, RRO, SFG, STI, STT, or TER. Synthesis of zeolites with the FER structure and discussion of pore geometry is disclosed in, for example, Weitkamp et al., *Chem. Eng. Technol.* 25, (2002), 3, 273-275; Pinar et al., *Proceedings of the 5$^{th}$ Serbian-Croatian-Slovenian Symposium on Zeolites,* 32-35; and Parikh et al., *Indian Journal of Chemical Technology,* 18, September 2011, 335-342, each of which is incorporated herein by reference in their entirety.

In some embodiments, the first zeolite is a large pore zeolite and the second zeolite is a small pore zeolite. In some embodiments, the first zeolite is a large pore zeolite and the second zeolite is a medium pore zeolite.

In some embodiments, the first zeolite is a BEA zeolite and the second zeolite is an FER zeolite.

In some embodiments, the ratio by weight of the first zeolite to the second zeolite is from about 1:9 to about 9:1. In some embodiments, the ratio by weight of the first zeolite to the second zeolite is from about 1:3 to about 3:1, for example, the ratio may be about 1:3, about 1:2.5, about 1:2, about 1:1.5, about 1:1, about 3:1, about 2.5:1, about 2:1, about 1.5:1 or about 1:1. In some embodiments, the ratio by weight of the first zeolite to the second zeolite is from about 0.1:9.9 to about 9:1. In some embodiments, the ratio by weight of the first zeolite to the second zeolite is from about 0.1:9.9 to about 1:1. In some embodiments, the ratio by weight of the first zeolite to the second zeolite is from about 0.1:9.9 to about 0.5:9.5, for example, about 0.1:9.9, about 0.2:9.8; about 0.3:9.7, about 0.4:9.6, or about 0.5:9.5.

In some embodiments, the third zeolite is a large pore zeolite. In some embodiments, the first zeolite is a large pore zeolite and the third zeolite is a large pore zeolite. In some embodiments, the first zeolite is a large pore zeolites and the third zeolite is a large pore zeolite, the first and third zeolite having different framework types.

In some embodiments, the third zeolite is a small pore zeolite. In some embodiments, the third zeolite is a medium pore zeolite. In some embodiments, the first zeolite is a large pore zeolite and the third zeolite is a small pore zeolite. In some embodiments, the first zeolite is a large pore zeolite and the third zeolite is a medium pore zeolite.

In some embodiments, the first zeolite is a large pore zeolite, the second zeolite is a small pore zeolite, and the third zeolite is a small pore zeolite. In some embodiments, the first zeolite is a large pore zeolite, the second zeolite is a small pore zeolite, the third zeolite is a small pore zeolite, and the second zeolite and the third zeolite have different framework types.

In some embodiments, the first zeolite is a large pore zeolite, the second zeolite is a small pore zeolite, and the third zeolite is a medium pore zeolite. In some embodiments, the first zeolite is a large pore zeolite, the second zeolite is a medium pore zeolite, and the third zeolite is a medium pore zeolite. In some embodiments, the first zeolite is a large pore zeolite, the second zeolite is a medium pore zeolite, the third zeolite is a medium pore zeolite, and the second zeolite and the third zeolite have different framework types.

In some embodiments, the first zeolite is a large pore zeolite, the second zeolite is a medium pore zeolite, and the third zeolite is a small pore zeolite.

In some embodiments, the present catalyst compositions, the first, second, and/or third zeolite comprise aluminosilicate zeolite crystals having a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm. In some embodiments, the first zeolite is a crystalline aluminosilicate zeolite having a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm. In some embodiments, the second zeolite is a crystalline alumino-silicate zeolite having a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm. In some embodiments, the third zeolite is a crystalline aluminosilicate zeolite having a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm. In some embodiments, the first and second zeolite, the first and third zeolite, the second and third zeolite, or the first, second, and third zeolite are crystalline aluminosilicate zeolites having a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm.

In some embodiments, the first, second, and/or third zeolite has a silica-to-alumina ratio (SAR) of from about 2 to about 300, including about 5 to about 250; about 5 to about 200; about 5 to about 100; and about 5 to about 50. In one or more specific embodiments, the molecular sieve has a SAR molar ratio in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50. In one or more embodiments, the molecular sieve has a SAR molar ratio in the range of about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

Without wishing to be bound by theory, a high zeolite sodium content may negatively impact hydrothermal stability. Therefore, a low content of sodium and alkali metals in the first, second, and/or third zeolite is generally preferred. In certain embodiments, the first, second, and/or third zeolite have an alkali content of less than 3 wt. %, more preferably less than 1 wt. %, and even more preferably less than 0.1 wt. % based on the total weight of the calcined zeolite (reported as the alkali metal oxide on a volatile-free basis).

In some embodiments, low alkali content zeolites can be provided by ion exchanging sodium (Na) form zeolites to the ammonia ($NH_4$) form. $NH_4$ ion exchange into the zeolite may be carried out at room temperature or at a temperature up to about 80° C. over a period of about 1 to 24 hours. In some embodiments, the resulting zeolite material may preferably be dried at about 100 to 120° C., to afford an $NH_4$-exchanged zeolite. In some embodiments, the $NH_4$-exchanged zeolite may be calcined at a temperature of at least about 450° C. to afford an H-exchanged zeolite.

Palladium Component

As referenced above, in the disclosed LT-NA catalyst compositions, the first, second, and third zeolite each generally comprise at least one palladium component. "Palladium component" refers to palladium metal or compounds thereof, for example, oxides.

Typically, as used herein, the "first" palladium component is associated with the "first" zeolite, the "second" palladium component is associated with the "second" zeolite, and the optional "third" palladium component is associated with the optional "third" zeolite. The first and second palladium components (as well as the third palladium component, where present) may be the same or different. In some embodiments, the first and second palladium components are the same. In some embodiments, the first, second, and third palladium components are the same.

In some embodiments, the disclosed catalyst compositions are described as comprising a zeolite "comprising" palladium (or as comprising palladium "associated with" the zeolite). In such instances, "comprising" (or "associated with") is understood to mean that the palladium resides either in the ion-exchange sites of the zeolite, on the surface of the zeolite, or both in the ion-exchange sites and on the surface of the zeolite.

The concentration of the first, second and optional third palladium components can vary, but will typically be from about 0.01 wt. % to about 6 wt. % relative to the total weight of the first, second, and optionally third zeolite, respectively. In some embodiments, the palladium component concentration in each of the first, second, and optional third zeolite may vary. For example, the first zeolite may have a higher concentration of palladium component than either one or both of the second or third zeolite. Likewise, the second zeolite may contain a higher concentration of palladium component relative to the first and/or third zeolite, or the optional third zeolite may contain a higher concentration of palladium component relative to the first and/or second zeolite. In some embodiments, the palladium component concentration in each zeolite is about equal.

Palladium may be present in each of the first and/or second, and/or third zeolite, for example, from about 0.1%, about 0.2%, about 0.5%, about 0.7%, about 0.9% or about 1.0%, to about 1.5%, about 2.0%, about 2.5%, about 3.0%, about 3.5%, about 4.0%, about 4.5%, or about 5.0% by weight, based on the total weight of the LT-NA catalyst composition. Weights of palladium are measured and reported as the metal. The total dry weight of the zeolite includes any added/exchanged metals (i.e., palladium).

The LT-NA catalyst compositions may, in some embodiments, contain other catalytically active metals such as copper, iron, manganese, magnesium, cobalt, nickel, platinum, ruthenium, rhodium or combinations thereof. Such metals can, in some embodiments, be present such that the zeolite further comprises the one or more catalytically active metals. In some embodiments, the LT-NA catalyst composition is substantially free of any further active metal.

While the foregoing description provides several suitable ranges or amounts for the zeolite and palladium components of the LT-NA catalyst composition, it should be noted that each disclosed range or amount for one of these components may be combined with a disclosed range or amount for the other components to form new ranges or sub-ranges. Such embodiments are also expressly contemplated by the invention.

Diesel Oxidation Catalyst (DOC) Composition

Generally, a DOC composition comprises one or more platinum group metal (PGM) components dispersed on a support, such as a refractory metal support. Various such DOC compositions are known for use in treating the exhaust of diesel engines in order to convert both hydrocarbon (HC) and carbon monoxide (CO) gaseous pollutants by catalyzing the oxidation of these pollutants to carbon dioxide and water. PGM components useful in the disclosed DOC compositions include any component that includes a PGM, such as platinum, palladium, ruthenium, rhodium, osmium, iridium, and/or gold (Pt, Pd, Ru, Rh, Os, Ir, and/or Au). For example, the PGM may be in metallic form, with zero valence, or the PGM may be in an oxide form. The PGM components can include the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component is a metal or an oxide thereof (e.g., including, but not limited to, platinum or an oxide thereof).

In particular embodiments, the DOC composition disclosed herein comprises both a platinum component and a palladium component (referred to herein as a "fourth palladium component" so as to distinguish it from the first, second, and optional third palladium components associated with the respective zeolite of the LT-NA composition disclosed above). The DOC composition may comprise, for example, a platinum component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry DOC composition. In some embodiments, the Pt/Pd ratio is from about 10:1 to about 1:10. In some embodiments, the Pt/Pd weight ratio is about 2/1.

Typically, both the platinum and palladium components of the disclosed DOC composition are supported on a support material (wherein the support material on which the platinum component and the palladium component are supported can be the same or different). Support materials can be zeolitic or non-zeolitic. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolite supports include, but are not limited to, high surface area refractory metal oxides.

The support material on which the catalytically active platinum component and fourth palladium component are deposited, for example, comprises a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 $m^2/g$ to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 $m^2$/g to about 350 $m^2$/g, for example from about 90 $m^2$/g to about 250 $m^2$/g.

In certain embodiments, metal oxide supports useful in the DOC catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Thus the refractory metal oxides or refractory mixed metal oxides in the DOC catalyst compositions are typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof.

The DOC catalyst composition may comprise any of the above named refractory metal oxides and in any amount. For example, refractory metal oxides in the catalyst composition may comprise at from about 15 wt. %, about 20 wt. %, about 25 wt. %, about 30 wt. % or about 35 wt. % to about 50 wt. %, about 55 wt. %, about 60 wt. % about 65 wt. % or about 70 wt. % based on the total dry weight of the catalyst composition. The catalyst composition may, for example, comprise from about 10 to about 99 wt. % alumina, from about 15 to about 95 wt. % alumina or from about 20 to about 85 wt. % alumina.

Preparation of Catalytic Compositions

The disclosed LT-NA catalyst and DOC compositions may, in some embodiments, be prepared via an incipient wetness impregnation method. Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support (e.g., zeolite or refractory metal oxide) containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying. One of skill in the art will recognize other methods for loading the palladium components into the supports of the present compositions, for example, adsorption, ion-exchange, precipitation, and the like.

For example, palladium may be impregnated on a zeolite in the preparation of components of the LT-NA catalyst composition Palladium salts useful for introduction of the first, second, and optional third palladium components to their respective zeolite include, but are not limited to, nitrate salts. Further, at least a portion of a catalytically active metal may be included during a zeolite synthetic process such that a tailored colloid contains a structure directing agent, a silica source, an alumina source and a metal ion source. In some embodiments, palladium and other metal salts may be mixed together and the mixture impregnated on a zeolite. The metals used in the salts may include, but are not limited to, metals selected from the group consisting of copper, iron, manganese, magnesium, cobalt, nickel, platinum, ruthenium, rhodium, and combinations thereof.

Similarly, for production of the DOC composition, generally, aqueous solutions of soluble compounds or complexes of the platinum group metals are used to impregnate the support material (e.g., zeolite or refractory metal oxide). Non-limiting examples of suitable compounds include palladium nitrate, tetraammine palladium nitrate, tetraammine platinum acetate, and platinum nitrate. During the calcination steps, or at least during the initial phase of use of the composite, such compounds are converted into a catalytically active form of the metal or a compound thereof. A suitable method of preparing a DOC catalyst composition is to prepare a mixture of a solution of a desired platinum group metal compounds (e.g., platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Catalytic Articles

Coating Compositions

To produce catalytic articles, a substrate as disclosed herein is coated with a catalytic composition. The coatings are "catalytic coating compositions" or "catalytic coatings." The terms "catalyst composition" and "catalytic coating composition" are synonymous.

A catalyst and/or sorbent composition as described herein may comprise one or more supports or "carriers" such as refractory inorganic solid oxide porous powders further comprising functionally active species.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt. % of the total washcoat loading. Alternatively the binder can be zirconia-based or silica-based, for example zirconium acetate, zirconia sol or silica sol. When present, the alumina binder is typically used in an amount of about 0.05 g/in$^3$ to about 1 g/in$^3$.

Substrates

In one or more embodiments, the present catalyst compositions are disposed on a substrate to form a catalytic article. Catalytic articles comprising the substrates are part of an exhaust gas treatment system (e.g., catalyst articles including, but not limited to, articles including the LT-NA and/or DOC compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein (e.g., a LT-NA catalyst composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

A catalytic article can be provided by applying a catalytic coating (e.g., as disclosed here) to the substrate as a washcoat. FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., two, three, or four or more) catalyst composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 $cm^3$, about 100 $cm^3$, about 200 $cm^3$, about 300 $cm^3$, about 400 $cm^3$, about 500 $cm^3$, about 600 $cm^3$, about 700 $cm^3$, about 800 $cm^3$, about 900 $cm^3$ or about 1000 $cm^3$ to about 1500 $cm^3$, about 2000 $cm^3$, about 2500 $cm^3$, about 3000 $cm^3$, about 3500 $cm^3$, about 4000 $cm^3$, about 4500 $cm^3$ or about 5000 $cm^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of >50%, >60%, >65% or >70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

A substrate is coated with a catalytic composition to form a catalytic article. The catalytic coating may comprise one or more thin, adherent coating layers disposed on and in adherence to least a portion of a substrate. In some embodiment, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, that is, an LT-NA composition, and a DOC catalyst composition each as described herein.

A catalyst composition may typically be applied in the form of a washcoat, containing support material having catalytically active species thereon. A sorbent composition may typically be applied in the form of a washcoat containing sorption active species. Catalyst and sorbent components may also, in some embodiments, be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

The above-noted catalyst composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The catalytic coating may comprise one, two or three or more coating layers. The one or more coating layers together comprise the catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Figure 3A:
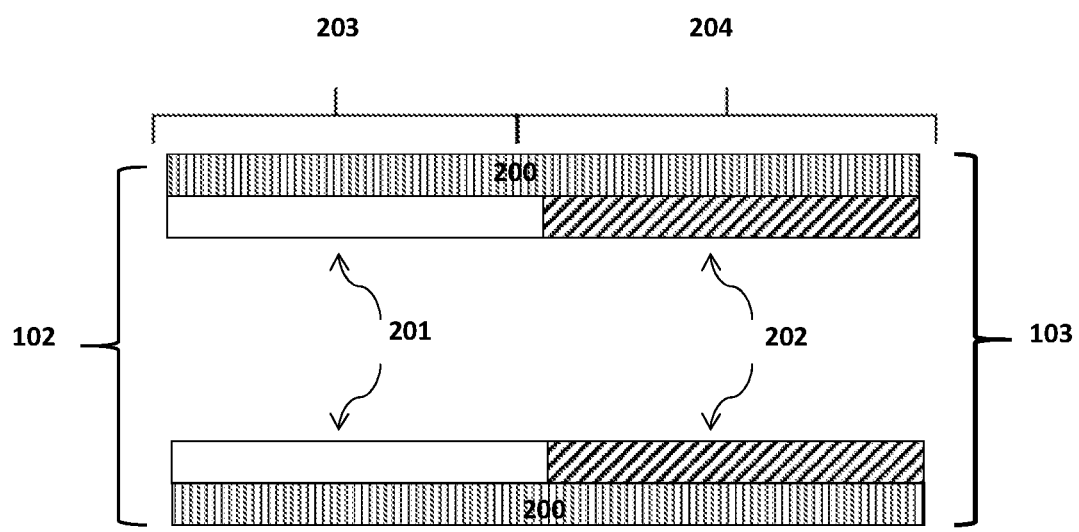
FIG. 3A is a cross-sectional view of an embodiment of a zoned LT-NA catalytic article of the present disclosure.
Figure 3B:
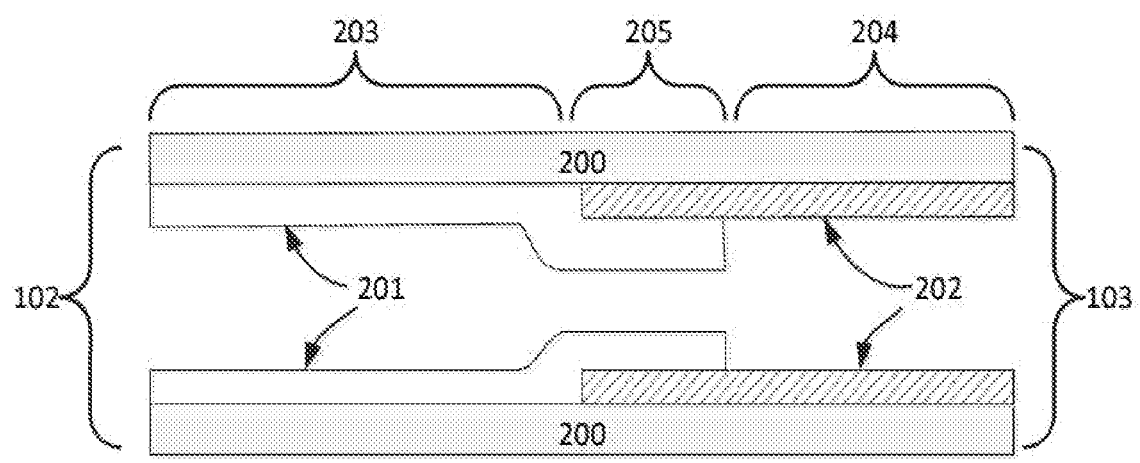
FIG. 3B is a cross-sectional view of an embodiment of a layered LT-NA catalytic article of the present disclosure.
Figure 3C:
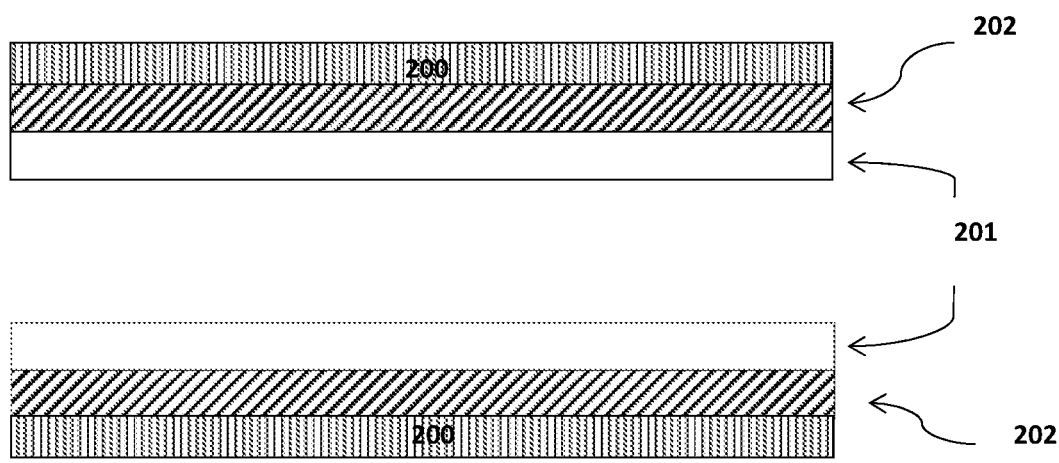
FIG. 3C is a cross-sectional view of another embodiment of a layered LT-NA catalytic article of the present disclosure.

FIGS. 3A, 3B and 3C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 3B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 3C, coating layers 201 and 202 each extend the entire length of the substrate with layer 201 overlaying layer 202. The substrate of FIG. 3C does not contain a zoned coating configuration. FIGS. 3A, 3B and 3C may be useful to illustrate coating compositions on the wall-through substrate. FIGS. 3A, 3B and 3C may further be useful to illustrate coating compositions on the flow-through substrate, as described herein below. Configurations of such coating layers are not limited.

For example, with respect specifically to the LT-NA catalyst composition disclosed herein, the first (Pd-containing) zeolite and the second (Pd-containing) zeolite may each be in a separate coating layer, where the coating layers are in a zone configuration from front to back or are in a layered configuration or some combination thereof. Alternatively, the LT-NA catalyst composition may be together in one homogenous coating layer or in some combination spread over two or three coating layers.

In some embodiments, the third (Pd-containing) zeolite, when present, may be in a separate coating layer from the first and/or second zeolite. In some embodiments, the third zeolite, when present, may overlap with the first zeolite, the second zeolite, or both the first and second zeolite. In some embodiments, the third zeolite, when present, may be in a homogenous mixture with the first zeolite, the second zeolite, or both the first and second zeolite.

In some embodiments, the LT-NA catalyst article comprises a first washcoat comprising the first zeolite disposed on at least a portion of the length of the catalyst substrate and a second washcoat comprising the second zeolite disposed on at least a portion of the length of the catalyst substrate. In some embodiments the second washcoat is directly on the catalyst substrate and the first washcoat is on at least a portion of the second washcoat. In some embodiments the first washcoat is directly on the catalyst substrate, and the second washcoat is on at least a portion of the first washcoat. In some embodiments, the catalyst article has a zoned configuration such that the first washcoat is disposed on the catalyst substrate from the inlet end to a length from about 10% to about 70% of the overall length, and the second washcoat is disposed on the catalyst substrate from the outlet end to a length from about 30 to about 90% of the overall length.

Figure 4A:
FIG. 4A is a cross-sectional view of a homogenous layer LT-NA catalytic article of the present disclosure.
Figure 4B:
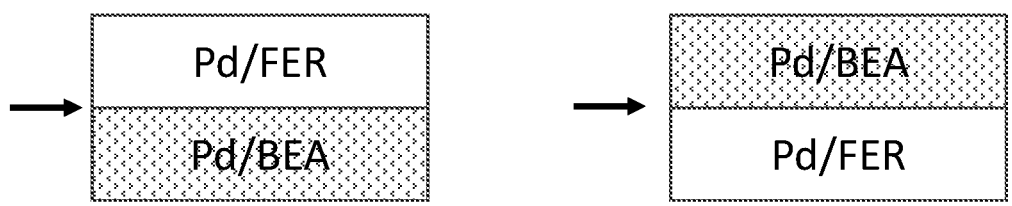
FIG. 4B is a cross-sectional view of two possible configurations of a two-layered LT-NA catalytic article of the present disclosure.
Figure 4C:
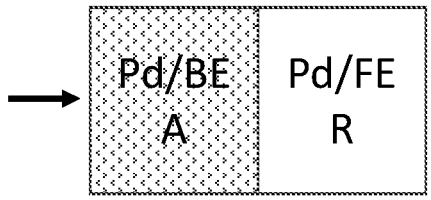
FIG. 4C is a cross-sectional view of a zoned LT-NA catalytic article of the present disclosure.

Exemplary non-limiting configurations for LT-NA catalyst compositions comprising a first zeolite and a second zeolite are illustrated in FIGS. 4A, 4B and 4C. FIG. 4A is a cross-sectional view of a homogenous LT-NA catalyst composition as described herein. FIG. 4B is a cross-sectional view of two different two-layered LT-NA catalyst compositions as described herein. FIG. 4C is a cross-sectional view of a zoned LT-NA catalyst composition as described herein.

Figure 5A:
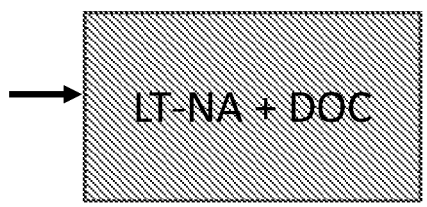
FIG. 5A is a cross-sectional view of a homogenous layer LT-NA/DOC catalytic article of the present disclosure.
Figure 5D:
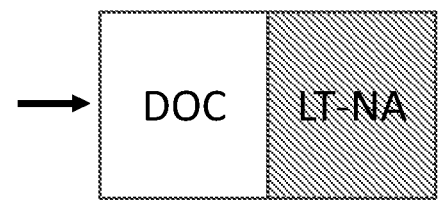
FIG. 5D is a cross-sectional view of a zoned LT-NA/DOC catalytic article of the present disclosure.
Figure 5B:
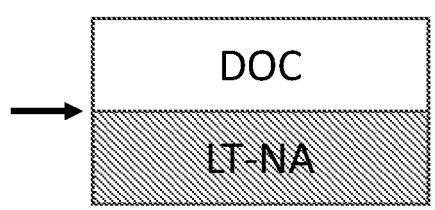
FIG. 5B is a cross-sectional view of a possible configuration of a two-layered LT-NA/DOC catalytic article of the present disclosure.
Figure 5E:
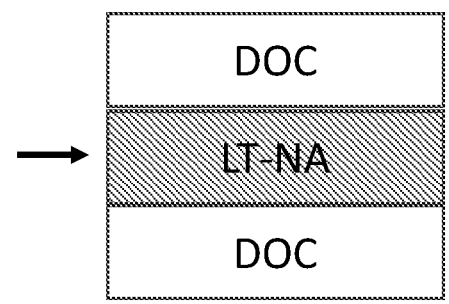
FIG. 5E is a cross-sectional view of a possible configuration of a three-layered LT-NA/DOC catalytic article of the present disclosure comprising two DOC layers.
Figure 5C:
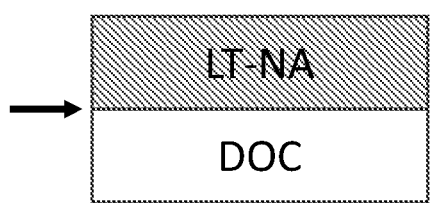
FIG. 5C is a cross-sectional view of a possible configuration of a two-layered LT-NA/DOC catalytic article of the present disclosure.

In some embodiments, the LT-NA article further comprises a diesel oxidation catalyst (DOC) composition disposed on the substrate. In some embodiments, the DOC composition comprises a Pt component and a fourth Pd component, wherein the Pt component and the fourth Pd component are supported on refractory metal oxide support materials. In some embodiments, the refractory metal oxide comprises gamma alumina or alumina doped with about 2% to about 10% $SiO_2$. In some embodiments, the DOC composition further comprises beta zeolite which is substantially free of any platinum-group metal (PGM) species. In some embodiments, the DOC composition is in a zoned configuration relative to the LT-NA composition layer(s). In some embodiments, the DOC composition may overlap one or more layers of the LT-NA composition. Exemplary, non-limiting configurations for LT-NA/DOC catalyst composition coatings comprising the inventive LT-NA and DOC compositions as disclosed herein are illustrated in FIGS. 5A to 5F. In some embodiments, the LT-NA catalyst composition and the DOC composition are present on a substrate in a single homogenous layer as depicted in FIG. 5A. In some embodiments, the LT-NA catalyst composition and the DOC composition are present in separate, discrete layers. FIGS. 5B and 5C illustrate two possible configurations where the LT-NA catalyst composition and the DOC composition are present on the substrate in separate layers. A zoned configuration with the DOC composition upstream from the LT-NA catalyst composition is illustrated in FIG. 5D.

The LT-NA/DOC catalyst article may comprise more than two layers, for example, three layers may be present. In some embodiments, the catalyst article further comprises a third layer. In some embodiments, the third layer comprises a second DOC composition. In some embodiments, there may be two DOC composition layers and one LT-NA catalyst composition layer. A possible non-limiting arrangement is shown in FIG. 5E. The two DOC compositions may be identical or different (e.g., with respect to PGM and support components and washcoat loadings). In some embodiments, the second DOC composition is identical to the first DOC composition. In some embodiments, the first layer is disposed between the second layer and the third layer. In some embodiments, the first and second DOC compositions both contain the same components (e.g., Pt component, fourth Pd component, refractory metal oxide support material, as disclosed herein), though the loadings in each washcoat layer may vary.

Figure 5F:
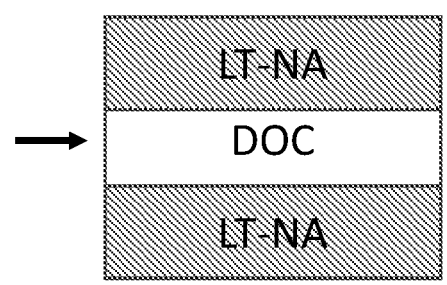
FIG. 5F is a cross-sectional view of a possible configuration of a three-layered LT-NA/DOC catalytic article of the present disclosure comprising two LT-NA layers.

Alternatively, in another embodiment of a three-layered configuration, there may be two LT-NA catalyst composition layers and one DOC composition layer. In some embodiments, the third layer comprises a second LT-NA catalyst composition. FIG. 5F illustrates a three-layered configuration with the DOC composition layer disposed between two separate LT-NA catalyst composition layers. The two LT-NA compositions may be identical or different (e.g., with respect to Pd/zeolite component and washcoat loadings). In some embodiments, the second LT-NA catalyst composition is identical to the first LT-NA catalyst composition. In some embodiments, the second layer is disposed between the first layer and the third layer. In some embodiments, the first and second LT-NA compositions both contain the same components (e.g., first and second Pd component, first and second zeolite, as disclosed herein), though the loadings in each washcoat layer may vary.

In some embodiments, other catalytic compositions can be incorporated on, under, or between any of the LT-NA and DOC catalyst composition layers referenced herein.

In some embodiments is provided a catalytic article having a first DOC composition directly on the substrate, a first LT-NA catalyst composition on the first DOC composition, and a second DOC composition on the first LT-NA composition. In some embodiments is provided a catalytic article having a second DOC composition directly on the substrate, a first LT-NA catalyst composition on the second DOC composition, and a first DOC composition on the first LT-NA composition.

In some embodiments is provided a catalytic article having a first LT-NA catalyst composition directly on the substrate, a first DOC catalyst composition on the first LT-NA catalyst composition, and a second LT-NA catalyst composition on the first DOC composition. In some embodiments is provided a catalytic article having a second LT-NA catalyst composition directly on the substrate, a first DOC composition on the second LT-NA catalyst composition, and a first LT-NA catalyst composition on the first DOC composition.

Loading of the present catalytic coatings on a substrate will depend on substrate properties such as porosity and wall thickness. Typically, wall-flow filter catalyst loading will be lower than catalyst loadings on a flow-through substrate. Catalyzed wall-flow filters are disclosed, for instance, in U.S. Pat. No. 7,229,597, which is incorporated herein by reference in its entirety. The present LT-NA and/or DOC catalyst compositions are generally present on the substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the substrate. Concentration of a catalyst composition, or any other component, on a substrate refers to concentration per any one three-dimensional section or zone, for instance any cross-section of a substrate or of the entire substrate.

In some embodiments, the LT-NA catalyst article comprises the first and second palladium components at a loading from about 15 $g/ft^3$ to about 200 $g/ft^3$ or from about 60 $g/ft^3$ to about 120 $g/ft^3$. In some embodiments, the LT-NA catalyst article comprises a total zeolite loading of from about 1 $g/in^3$ to about 5 $g/in^3$ or from about 2 $g/in^3$ to about 3 $g/in^3$. In some embodiments, the catalyst article comprises a silica-to-alumina ratio (SAR) of from about 5 to about 50 or about 10 to about 35.

The present LT-NA catalyst article, which can comprise a flow-through or wall-flow filter substrate, as disclosed herein, provides desirable $NO_x$ adsorption and desorption properties, for example, adsorbing $NO_x$ at low temperatures and releasing trapped $NO_x$ at elevated temperatures. Preferably, the LT-NA catalyst article is capable of adsorbing a significant portion of the NO present in an exhaust gas stream. In some embodiments, the LT-NA catalytic article adsorbs $NO_x$ during cold-start condition (e.g., the LT-NA catalytic article is below 200° C.). In some embodiments, the LT-NA catalytic article desorbs $NO_x$ during under high temperature operation (e.g., the LT-NA catalytic article is above 300° C.).

Exhaust Gas Treatment Systems

The present disclosure further provides an exhaust gas treatment system for reducing a $NO_x$ level in an exhaust gas stream from an internal combustion engine, the exhaust gas treatment system comprising a catalytic article as disclosed herein. In another aspect of the present invention is provided a method for reducing a $NO_x$ level in an exhaust gas stream from an internal combustion engine, the method comprising contacting the exhaust gas stream with a catalytic article as disclosed herein, or an emission treatment system as disclosed herein. The present invention therefore provides an emission treatment system that incorporates the catalytic articles described herein, such as an emission treatment system generally comprising an engine producing an exhaust gas stream and one or more catalytic articles positioned downstream from the engine in fluid communication with the exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a LT-NA catalyst article, which can comprise a flow-through or wall-flow filter substrate, as disclosed herein. In particular, systems comprise a LT-NA catalyst article suitable for adsorbing $NO_x$ at low temperatures and releasing trapped $NO_x$ at elevated temperatures. The $NO_x$ adsorption component of the present catalyst compositions provide desirable $NO_x$ adsorption and desorption properties under various engine operating conditions.

Preferably, the LT-NA catalyst article is capable of adsorbing a significant portion of the NO present in the exhaust gas stream. More importantly however, the LT-NA catalyst article does not release NO species until the exhaust gas stream and/or the exhaust gas emission system has reached a temperature high enough for other catalytic components to be active. Only then can the released NO be converted efficiently to $N_2$ and exit the exhaust gas treatment system. As such the LT-NA catalyst article is generally located upstream of any catalytic components responsible for the conversion of NO released from the LT-NA. In some embodiments, the LT-NA catalyst article adsorbs NO species present in the exhaust gas stream at low temperatures, which may have optionally been treated with at least a DOC and/or CSF component.

In some embodiments, the LT-NA catalyst article is not located in a separate component (e.g., on a separate substrate) but can be included in the same component, such as the diesel oxidation catalyst (DOC), catalyzed soot filter (CSF), or catalytic selective reduction (SCR) catalyst component, wherein the catalytic compositions for such components are applied to the substrate in a zoned or layered configuration.

Systems of the present disclosure can contain, in addition to the LT-NA catalyst article, for example, a DOC, a reductant injector, SCR catalyst component, a soot filter (which can be catalyzed or uncatalyzed), and/or an ammonia oxidation catalyst ($AMO_x$). A suitable DOC for use in the emission treatment system is able to effectively catalyze the oxidation of CO and HC to carbon dioxide ($CO_2$). Preferably, the DOC is capable of converting at least 50% of the CO or HC component present in the exhaust gas. The DOC may be located, for example, downstream of the LT-NA catalyst article. In some embodiments, the DOC is located upstream of an SCR catalyst component and/or soot filter.

The exhaust gas treatment system of the present disclosure may further comprise an SCR catalyst component. The SCR catalyst component may be located upstream or downstream of the DOC and/or soot filter. A suitable SCR catalyst component for use in the emission treatment system is able to effectively catalyze the reduction of the $NO_x$ exhaust component at temperatures as high as 650° C. In addition, the SCR catalyst component must be active for reduction of $NO_x$ even under conditions of low load which typically are associated with lower exhaust temperatures. Preferably, the SCR catalyst component is capable of converting at least 50% of the $NO_x$ (e.g., NO) component to $N_2$, depending on the amount of reductant added to the system. Another desirable attribute for the SCR catalyst component is that it possesses the ability to catalyze the reaction of $O_2$ with any excess $NH_3$ to form $N_2$, so that $NH_3$ is not emitted to the atmosphere. Useful SCR catalyst components used in the emission treatment system should also have thermal resistance to temperatures greater than 650° C. Such high temperatures may be encountered during regeneration of the catalyzed soot filter. Suitable SCR catalyst components are described, for instance, in U.S. Pat. Nos. 4,961,917 and 5,516,497, each of which is incorporated herein by reference in its entirety.

Figure 6A:
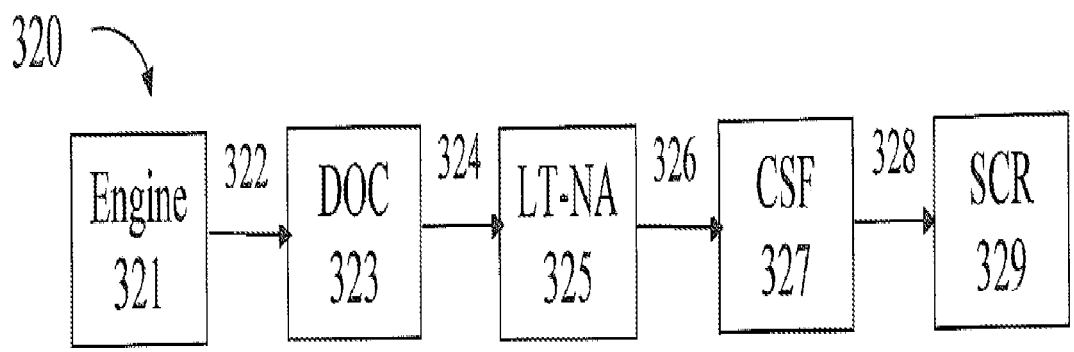
FIG. 6A is a schematic depiction of an embodiment of an emission treatment system comprising a LT-NA catalytic article of the present disclosure, wherein the LT-NA catalytic article is located downstream of a diesel oxidation catalyst (DOC) and upstream of a catalyzed soot filter (CSF) and a selective catalytic reduction (SCR) catalyst component.

Exemplified exhaust gas treatment systems may be more readily appreciated by reference to FIGS. 6A-6D and FIGS. 7A-7F, which depict schematic representations of exhaust gas treatment systems in accordance with embodiments of the present invention. Referring to FIG. 6A, exhaust gas treatment system 320 is provided, in which an exhaust gas stream containing gaseous pollutants (e.g., unburned hydrocarbons, carbon monoxide and NO) and particulate matter is conveyed via line 322 from an engine 321 to a DOC 323. In the DOC 323, unburned gaseous and non-volatile hydrocarbons and carbon monoxide are largely combusted to form carbon dioxide and water. The exhaust stream is next conveyed via line 324 to a LT-NA catalyst article 325 for the adsorption and/or storage of NO. The treated exhaust gas stream 326 is next conveyed to a CSF 327, which traps particulate matter present within the exhaust gas stream. After removal of particulate matter, via CSF 327, the exhaust gas stream is conveyed via line 328 to a downstream SCR catalyst component 329, which provides treatment and/or conversion of NO. The exhaust gas passes through the SCR catalyst component 329 at a flow rate which allows sufficient time for the catalyst composition to reduce the level of $NO_x$ (in combination with a reductant) in the exhaust gas at a given temperature in the exhaust gas before exiting the system.

Figure 6B:
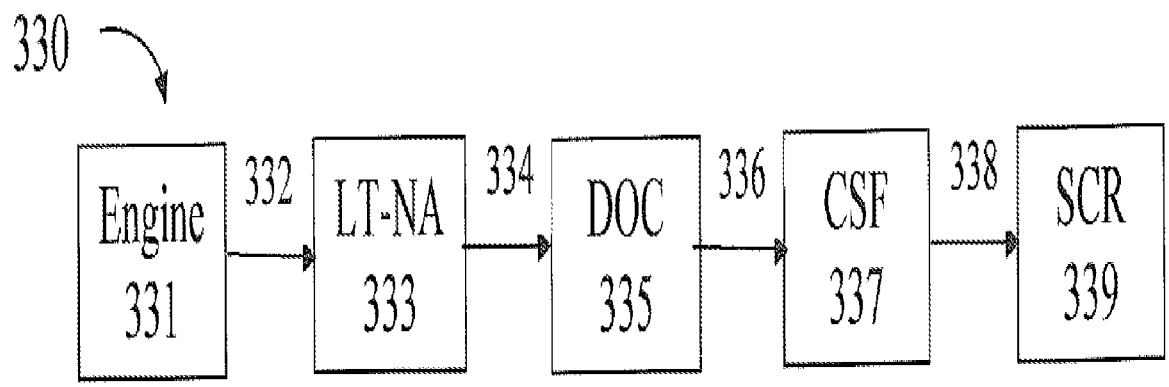
FIG. 6B is a schematic depiction of an embodiment of an emission treatment system comprising a LT-NA catalytic article of the present disclosure, wherein the LT-NA catalytic article is located upstream of a DOC), a CSF, and a SCR catalyst component.

Another embodiment of an exhaust gas treatment system of the invention is shown in FIG. 6B, which depicts a schematic representation of an exhaust gas treatment system 330 in accordance with the present disclosure. Referring to FIG. 6B, an exhaust gas stream is conveyed via line 332 from an engine 331 to a LT-NA catalyst article 333. Next, the exhaust stream is conveyed via line 334 to a DOC 335 and further conveyed via line 336 to CSF 337. Treated exhaust gas stream 338 is conveyed to SCR catalyst component 339 before being expelled into the atmosphere.

Figure 6C:
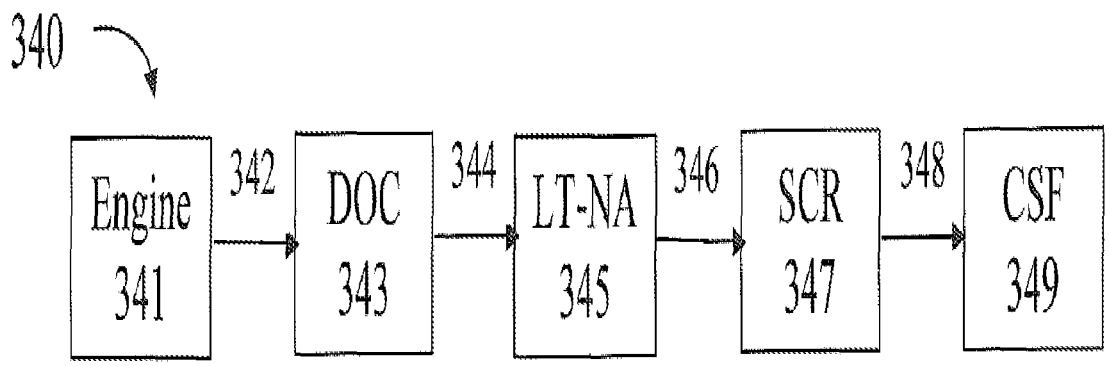
FIG. 6C is a schematic depiction of an embodiment of an emission treatment system comprising a LT-NA catalytic article of the present disclosure, wherein the LT-NA catalytic article is located downstream of a DOC and upstream of a SCR catalyst component, and a CSF.

Another embodiment of an exhaust gas treatment system of the disclosure is shown in FIG. 6C, which depicts a schematic representation of an exhaust gas treatment system 340. Referring to FIG. 6C, an exhaust gas stream is conveyed via line 342 from an engine 341 to a DOC 343 and further via exhaust gas stream 344 to a LT-NA 345. Next, the exhaust stream is conveyed via line 346 to a SCR catalyst component 347 and further conveyed via line 348 to CSF 349. Treated exhaust gas stream 338 is conveyed to SCR catalyst component 339 before exiting the system.

Figure 6D:
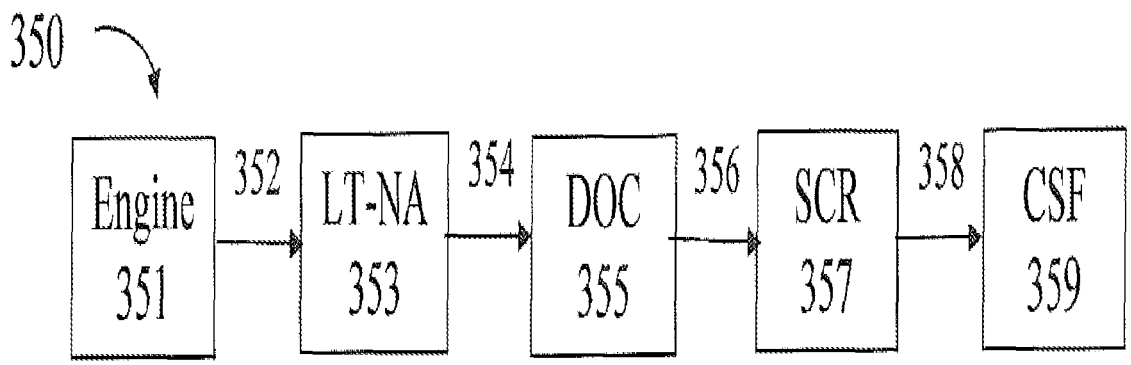
FIG. 6D is a schematic depiction of an embodiment of an emission treatment system comprising a LT-NA catalytic article of the present disclosure, wherein the LT-NA catalytic article is located upstream of a DOC, a SCR catalyst component, and a CSF.

Another embodiment of an exhaust gas treatment system of the disclosure is shown in FIG. 6D, which depicts a schematic representation of an exhaust gas treatment system 350 in accordance with the present disclosure. Referring to FIG. 6D, an exhaust gas stream is conveyed via line 352 from an engine 351 to a LT-NA catalytic article 353 and further via gas exhaust line 354 to DOC 355. Exhaust gas line 356 is conveyed to SCR catalyst component 357, and then the exhaust stream 358 is conveyed to CSF 359 before exiting the system.

Figure 7A:
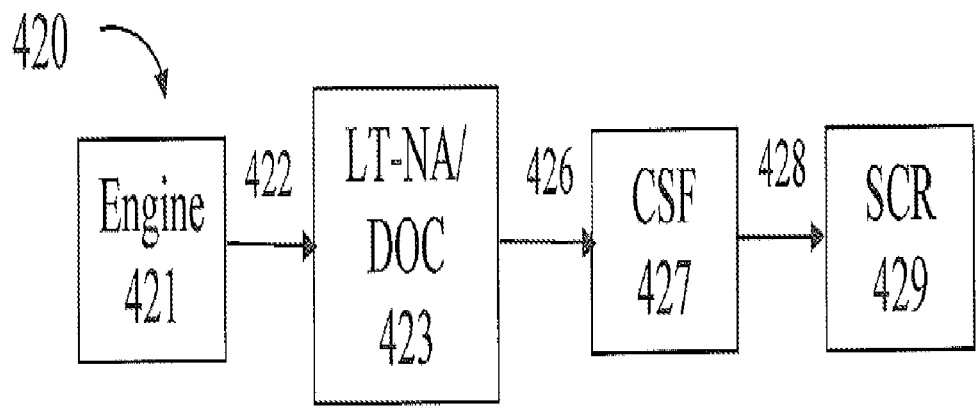
FIG. 7A is a schematic depiction of an embodiment of an emission treatment system comprising a LT-NA catalytic article of the present disclosure combined with a DOC (LT-NA/DOC), wherein the LT-NA/DOC is located upstream of a CSF and a SCR catalyst component.

Another embodiment of an exhaust gas treatment system of the disclosure is shown in FIG. 7A, which depicts a schematic representation of an exhaust gas treatment system 420. Referring to FIG. 7A, an exhaust gas stream is conveyed via line 422 from an engine 421 to a combination catalyst 423 having a LT-NA catalyst composition and a DOC on the same substrate. Exhaust gas stream 426 is further conveyed to a CSF 427 and further via gas exhaust line 428 to SCR catalyst component 429 before exiting the system.

Figure 7B:
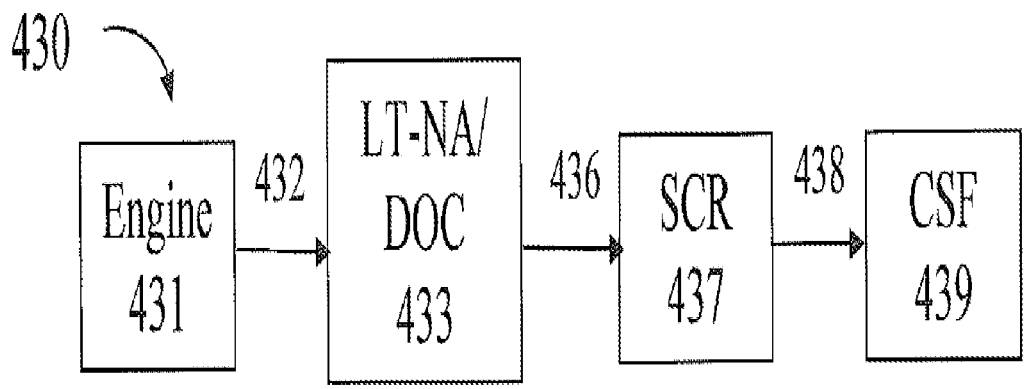
FIG. 7B is a schematic depiction of an embodiment of an emission treatment system comprising a LT-NA catalytic article of the present disclosure combined with a DOC (LT-NA/DOC), wherein the LT-NA/DOC is located upstream of a CSF and a SCR catalyst component.

Another embodiment of an exhaust gas treatment system of the disclosure is shown in FIG. 7B, which depicts a schematic representation of an exhaust gas treatment system 430. Referring to FIG. 7B, an exhaust gas stream is conveyed via line 432 from an engine 431 to a combination catalyst 433 having a LT-NA catalyst composition and a DOC on the same substrate. Exhaust gas stream 436 is further conveyed to a SCR catalyst component 437 and further via gas exhaust line 438 to CSF 439 before exiting the system.

Figure 7C:
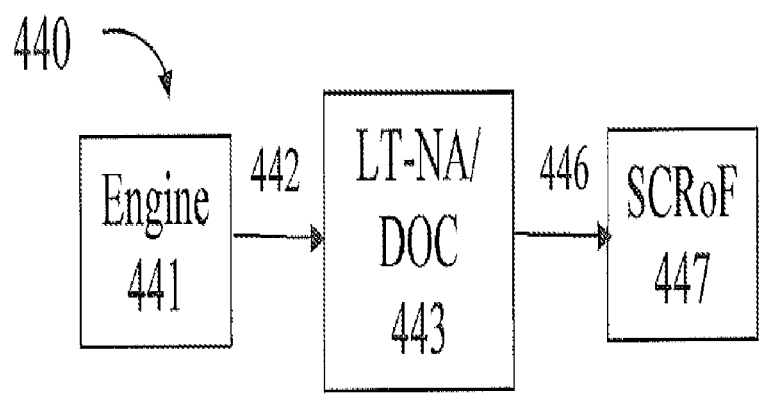
FIG. 7C is a schematic depiction of an embodiment of an emission treatment system comprising a LT-NA catalytic article of the present disclosure combined with a DOC (LT-NA/DOC), wherein the LT-NA/DOC is located upstream of a combined SCR catalyst component-catalyzed soot filter (SCRoF)

Another embodiment of an exhaust gas treatment system of the disclosure is shown in FIG. 7C, which depicts a schematic representation of an exhaust gas treatment system 440. Referring to FIG. 7C, an exhaust gas stream is conveyed via line 442 from an engine 441 to a combination catalyst 443 having a LT-NA catalyst composition and a DOC on the same substrate. Exhaust gas stream 446 is further conveyed to a combination SCR catalyst component and catalyzed soot filter (SCRoF) 447 before exiting the system.

Figure 7D:
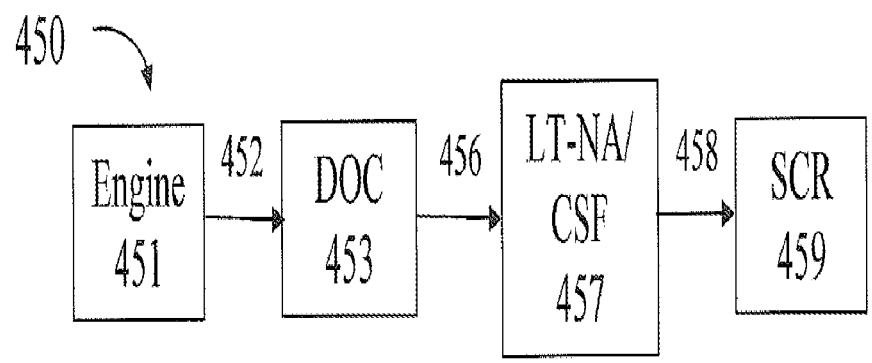
FIG. 7D is a schematic depiction of an embodiment of an emission treatment system comprising a LT-NA catalytic article of the present disclosure combined with a catalyzed soot filter (LT-NA/CSF), wherein the LT-NA/CSF is located upstream of a DOC and downstream of a SCR catalyst component.

Another embodiment of an exhaust gas treatment system of the disclosure is shown in FIG. 7D, which depicts a schematic representation of an exhaust gas treatment system 450. Referring to FIG. 7D, an exhaust gas stream is conveyed via line 452 from an engine 451 to a DOC 453 and exhaust gas stream 456 is further conveyed to a to a combination catalyst 457 having a LT-NA catalyst composition and a CSF on the same substrate. Exhaust gas stream 458 is further conveyed to a SCR catalyst component 459 before exiting the system.

Figure 7E:
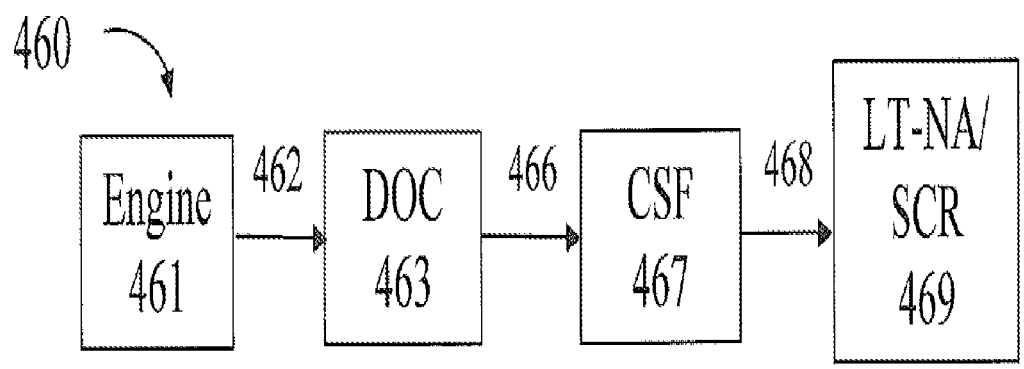
FIG. 7E is a schematic depiction of an embodiment of an emission treatment system comprising a LT-NA catalytic article of the present disclosure combined with a SCR catalyst component (LT-NA/SCR), wherein the LT-NA/SCR is located upstream of a CSF and a DOC.

Another embodiment of an exhaust gas treatment system of the disclosure is shown in FIG. 7E, which depicts a schematic representation of an exhaust gas treatment system 461. Referring to FIG. 7E, an exhaust gas stream is conveyed via line 462 from an engine 461 to a DOC 463 and exhaust gas stream 466 is further conveyed to a CSF 467. The resulting exhaust gas stream 468 is further conveyed a combination catalyst 469 having a LT-NA catalyst composition and a SCR catalyst component on the same substrate before exiting the system.

Figure 7F:
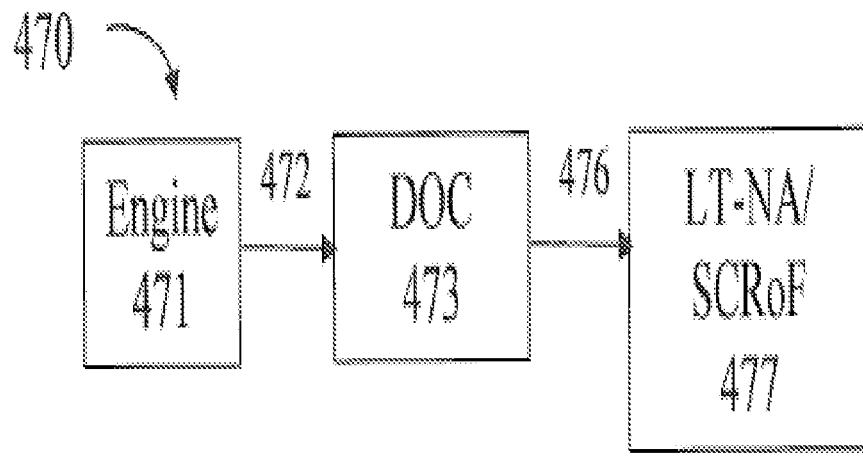
FIG. 7F is a schematic depiction of an embodiment of an emission treatment system comprising a LT-NA catalytic article of the present disclosure combined with a joint SCR catalyst component-catalyzed soot filter (LT-NA/SCRoF), wherein the LT-NA/SCROF is located upstream of a DOC.

Another embodiment of an exhaust gas treatment system of the disclosure is shown in FIG. 7F, which depicts a schematic representation of an exhaust gas treatment system 470. Referring to FIG. 7F, an exhaust gas stream is conveyed via line 472 from an engine 471 to a DOC 473 and exhaust gas stream 476 is further conveyed to a combination catalyst 477 having a LT-NA catalyst composition and a SCRoF on the same substrate before exiting the system.

Any exemplified exhaust gas treatment system depicted by FIG. 6A-6D and FIG. 7A-7F may be followed by a selective ammonia oxidation catalyst ($AMO_x$) to remove $NH_3$ released from the SCR catalyst component and selectively oxidize it to $N_2$.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Catalyst Article Preparation

Example 1. Pd-Large Pore Zeolite Catalyst Article

A zeolite beta material (BEA) was incipient wetness impregnated with a diluted $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size $D_{90}$ reached 10-12 μm. The slurry was then coated at 42-46% solid content onto a 400/4 honeycomb substrate. After drying, the catalyst was calcined at 590° C. for 1 hour in air. The Pd loading was 60 g/ft$^3$, the zeolite washcoat loading was 2.0 g/in$^3$, and the resulting $ZrO_2$ loading after calcination was ~5% of the washcoat composition.

Examples 2A and 2B. Pd-Medium Pore Zeolite Catalyst Articles

A zeolite ferrierite material (FER) was incipient wetness impregnated with a diluted $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size $D_{90}$ reached 10-15 μm. The slurry was then coated at 42-46% solid content onto a 400/4 honeycomb substrate. After drying, the catalyst was calcined at 590° C. for 1 hour in air. For Example 2A, the Pd loading was 60 g/ft$^3$ and the zeolite washcoat loading was 2.0 g/in$^3$. For Example 2B, the Pd loading was 90 g/ft$^3$ and the zeolite washcoat loading was 3.0 g/in$^3$. The resulting $ZrO_2$ loading in both examples after calcination was ~5% of the washcoat composition.

Example 3. Pd-Small Pore Zeolite Catalyst Article

A zeolite Chabazite material (CHA) was incipient wetness impregnated with a diluted $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size $D_{90}$ reached 10-15 μm. The slurry was then coated at 42-46% solid content onto a 400/4 honeycomb substrate. After drying, the catalyst was calcined at 590° C. for 1 hour in air. The Pd loading was 60 g/ft$^3$, the zeolite washcoat loading was 2.0 g/in$^3$, and the resulting $ZrO_2$ loading after calcination was ~5% of the washcoat composition.

Example 4. Zoned Pd/BEA and Pd/FER LT-NA Catalyst Article

Samples according to Example 1 and Example 2 were prepared as described above. Each sample was cut in half, and one half of each sample was assembled into a zoned sample by placing the Pd/BEA coated substrate at the inlet position and Pd/FER coated substrate at the outlet position.

Example 5. LT-NA Catalyst Article Coated with Homogenous Mixture of Pd-Large Pore Zeolite and Pd-Medium Pore Zeolite Catalyst Compositions A Pd/BEA and a Pd/FER slurry were each prepared similarly to Example 1 & Example 2. The Pd % on each individual zeolite was maintained at 1.74%. The two slurries were mixed in the desired solid/solid ratio, then coated at 42-46% solid content onto a 400/4 honeycomb substrate. After drying, the catalyst was calcined at 590° C. for 1 hour in air. The total Pd loading was 60 g/ft$^3$, the total zeolite washcoat loading was 2.0 g/in$^3$, and the resulting $ZrO_2$ loading after calcination was ~5% of the washcoat composition.

Example 6. LT-NA Catalyst Article Coated with Mixture of Pd-Large Pore Zeolite and Pd-Small Pore Zeolite Catalyst Compositions A Pd/BEA and a Pd/CHA slurry were each prepared similarly to Example 1 & Example 3. The Pd wt. % on each individual zeolite was maintained at 1.74%. The two slurries were mixed at the desired solid/solid ratio, then coated at 42-46% solid content onto a 400/4 honeycomb substrate. After drying, the catalyst was calcined at 590° C. for 1 hour in air. The total Pd loading was 60 g/ft$^3$, the total zeolite washcoat loading was 2.0 g/in$^3$, and the resulting $ZrO_2$ loading after calcination was ~5% of the washcoat composition.

Example 7. A LT-NA/DOC Catalytic Article

An LT-NA bottom layer was prepared similarly to Example 6, except that the Pd loading and washcoat loading were lowered to 75% of the original value (45 g/ft$^3$ Pd, 1.5 g/in$^3$ zeolite). For the DOC top layer, a 5% $SiO_2$—$Al_2O_3$ material was incipient wetness impregnated with a diluted Pt-ammine complex solution, then added to a diluted Pd nitrate solution to form a slurry suspension. The pH of the slurry suspension was adjusted to 4-5 with diluted $HNO_3$. The slurry was milled to $D_{90}$=12-15 μm, then beta zeolite and an alumina binder material (3.5% of the total washcoat solids) were added. The slurry was then coated at 25-30% solid content onto the LT-NA bottom layer. After drying, the sample was calcined at 590° C. for 1 hour in air. The Si-alumina loading was 0.75 g/in$^3$, beta zeolite loading was 0.35 g/in$^3$, the PGM loading was 21 g/ft$^3$, and the Pt/Pd weight ratio was 2/1.

Example 8. An LT-NA/DOC Catalytic Article

An LT-NA bottom layer was prepared similarly to Example 5, except that the Pd loading and washcoat loading were lowered to 80 g/ft$^3$ and 2.5 g/in$^3$, respectively. The BEA/FER ratio remained at 1:1, and the Pd loading was evenly divided between the two zeolites. The DOC layer was prepared similarly as in Example 7.

Catalyst Article Evaluation

The monolithic catalytic articles were tested on a diesel vehicle simulator. The feed composition was derived from a medium duty diesel engine, and NO-only was used for the inlet $NO_x$. The catalyst dimension was 1×1×3". Each catalyst was in-situ pretreated at 500° C. for 15 minutes in 10% $O_2$/5% $H_2O$/5% $CO_2$/$N_2$, then subject to a continuous sequence of FTP, FTP-US06, and FTP tests, in that order. The cold-start $NO_x$ adsorption efficiency was defined as the percentage of $NO_x$ adsorbed from the start to the point when the inlet temperature first reached 200° C.

Example 9. Exhaust Gas Treatment Results

Figure 8:
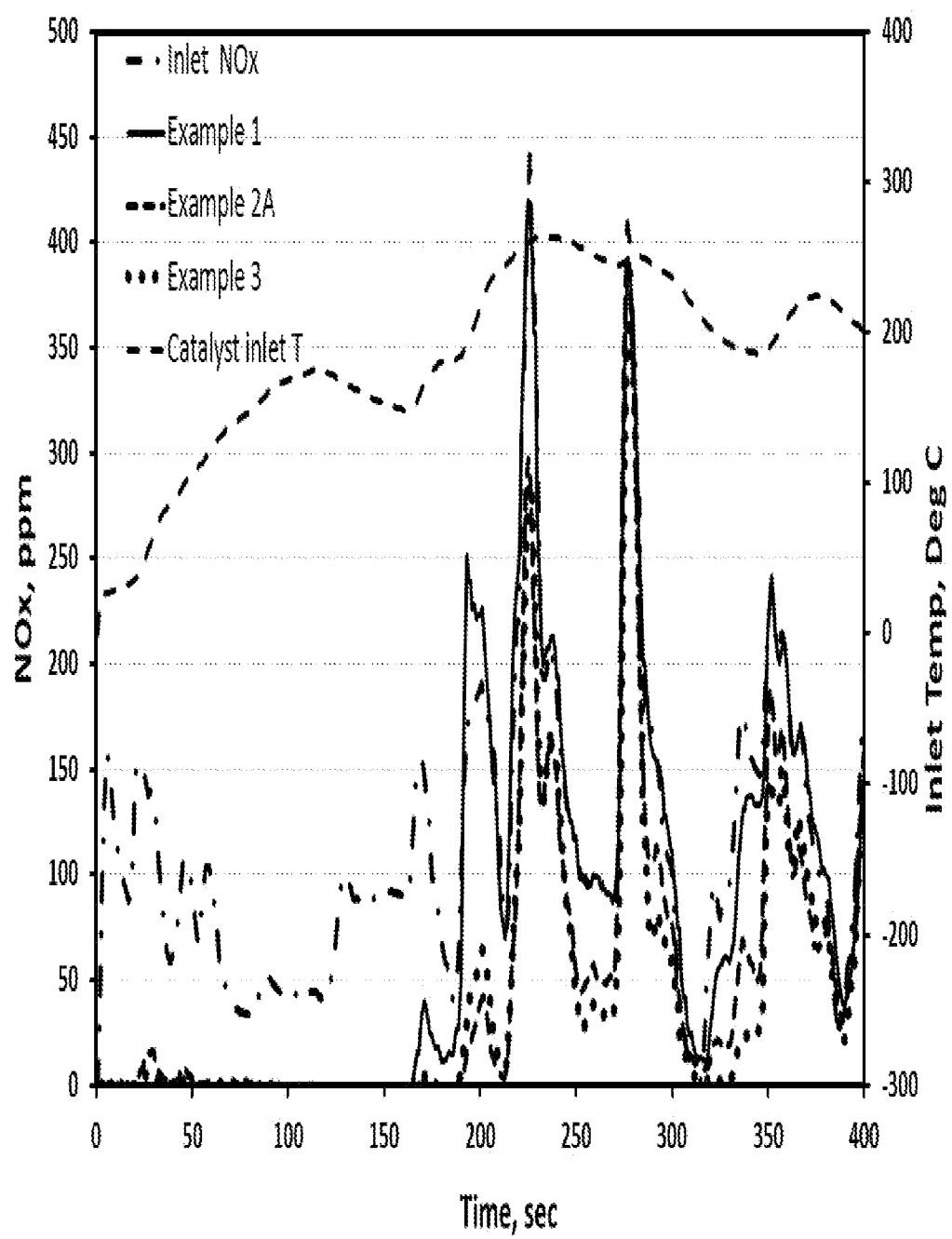
FIG. 8 is a line graph showing the $NO_N$ concentration at various times and temperatures for several catalytic compositions of the present disclosure.

FIG. 8 is a plot of $NO_x$ concentration versus time from 0-400 seconds in the first FTP cycle. The period from 0-197 seconds was defined as cold-start where the catalyst inlet temperature stayed below 200° C. All three catalyst compositions (Example 1, 2A and 3) showed nearly complete $NO_x$ adsorption up to ~160 seconds. Example 1, Pd/BEA, which possessed a 12-member ring structure and had a pore size<6 Å, started to release $NO_x$ shortly before 200 seconds, when the catalyst inlet temperature barely reached 200° C. Both Example 2A, Pd/FER, which possessed a 10-member ring and <5 Å pore opening, and Example 3, Pd/CHA, which possessed an 8-member ring structure and <4 Å pore opening, continued to adsorb $NO_x$ to a higher temperature.

Figure 9:
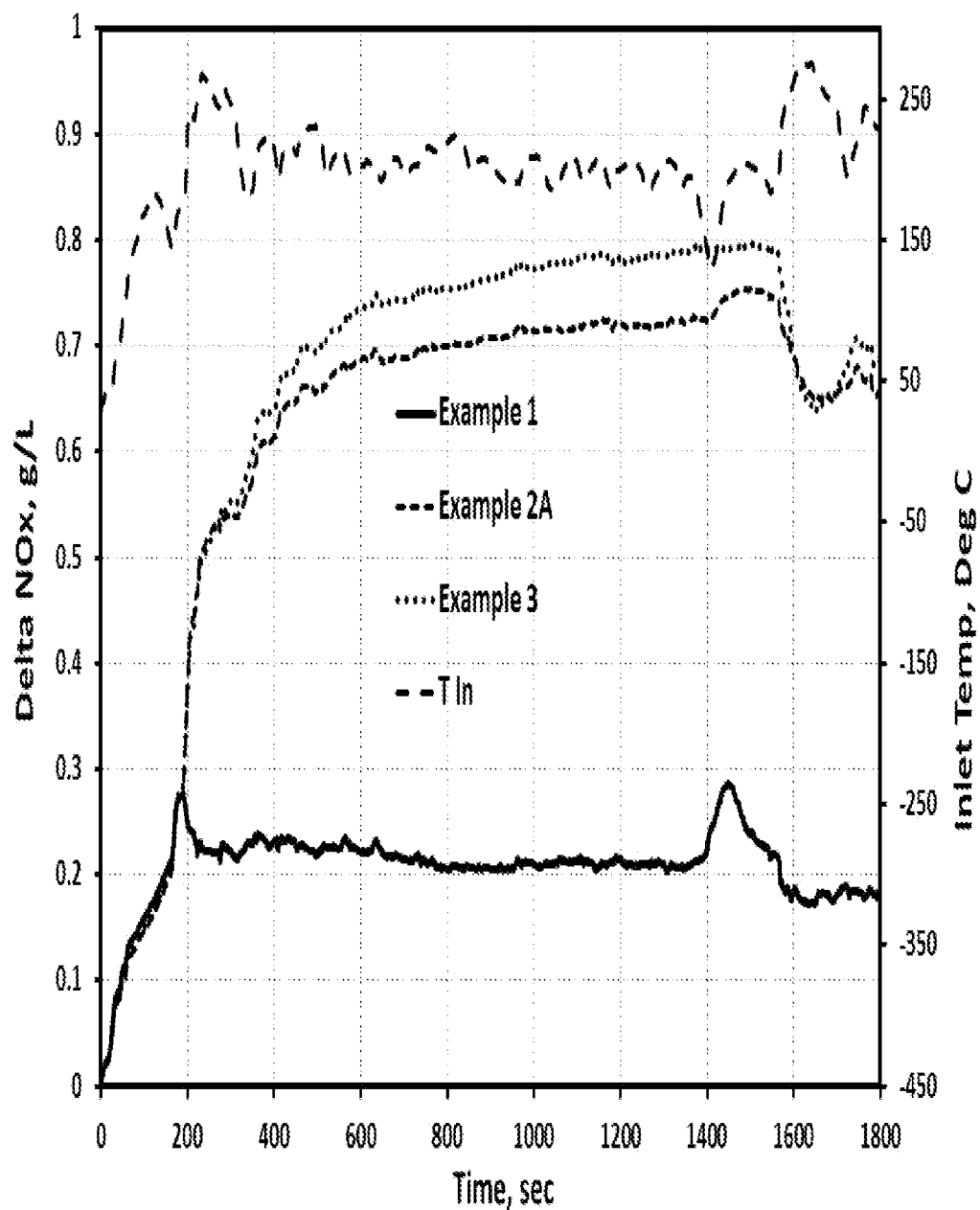
FIG. 9 is a line graph showing the difference of cumulative $NO_x$ of inlet and outlet (i.e., delta $NO_x$) as a function of time for various catalyst composition samples of the disclosure.

FIG. 9 demonstrates that complete $NO_x$ regeneration was not observed at the end of the FTP cycle when maximum temperature was ~300° C. for any of the three catalyst Examples 1-3.

Figure 10:
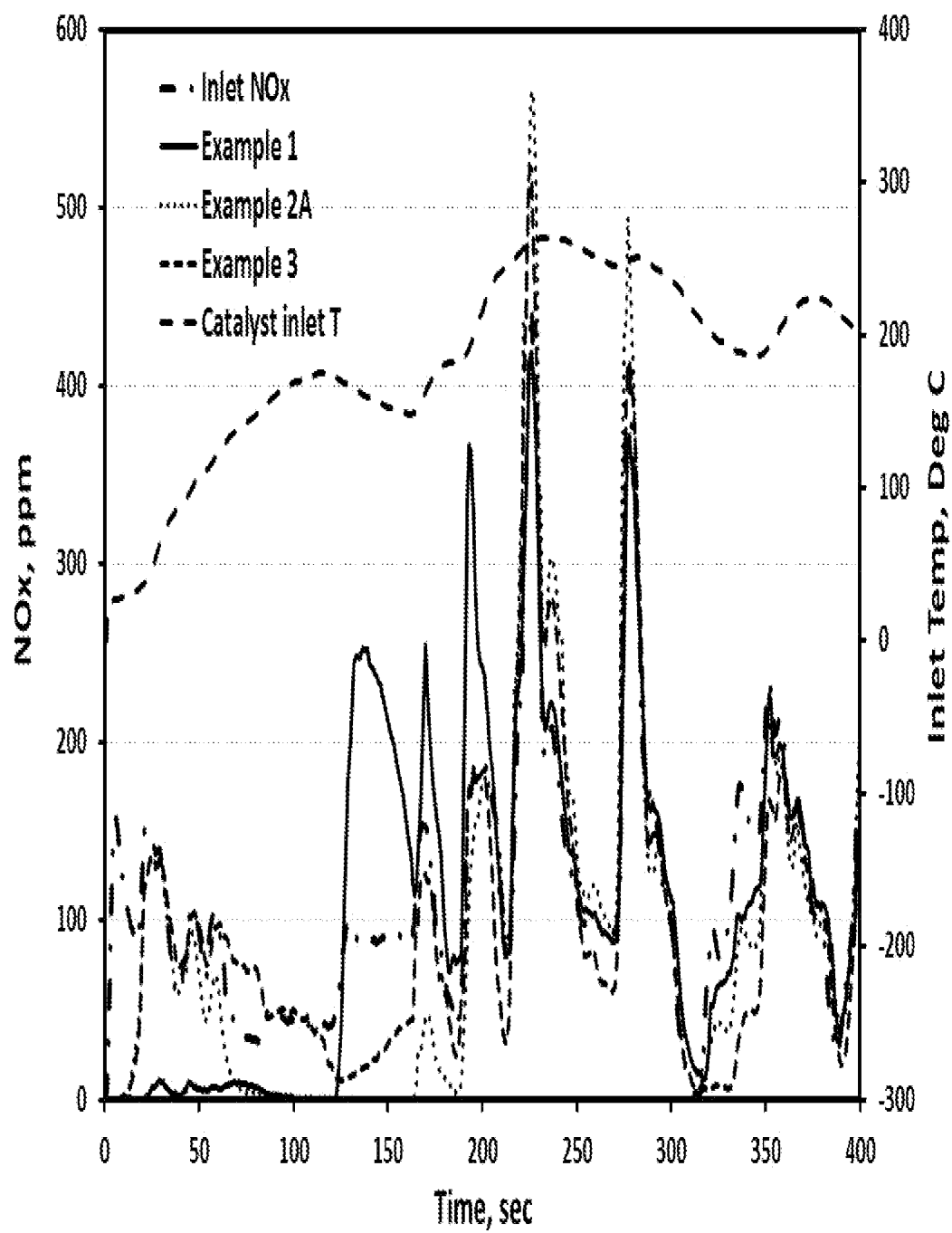
FIG. 10 is a line graph showing the catalyst outlet $NO_x$ concentration as a function of time for various catalyst composition samples.

FIG. 10 demonstrates that all three catalysts showed lower $NO_x$ adsorption efficiency during the cold-start of subsequent FTP cycle (0-200 second) due to insufficient $NO_x$ desorption. Although Pd/BEA (Example 1) continued to exhibit excellent $NO_x$ adsorption until ~120 second, abrupt $NO_x$ desorption occurred immediately which contributed to overall lower $NO_x$ adsorption efficiency during the cold-start period. Example 2A (Pd/FER) appeared to suffer from significant activity loss at the beginning of the cycle (0-60 sec), but adsorption activity quickly recovered; furthermore the $NO_x$ desorption occurred favorably at ~260° C. Example 3 (Pd/CHA) not only performed the worst during 0-120 seconds when $NO_x$ adsorption was most crucial, but also started to show desorption at ~150° C.

Without wishing to be bound by theory, the stark difference observed in these three different zeolite structures suggested that Pd in a large pore and 3-dimentional zeolite such as BEA may be most favorable for cold-start $NO_x$ adsorption, particularly when regeneration was not efficient. However, the large pore channels may also exert less physical interaction with adsorbed NO molecules, which in turn may result in early $NO_x$ release. Pd/FER (Example 2A), which possessed a two-dimensional medium pore structure, did not seem to admit $NO_x$ easily at lower temperature and higher space velocity if it had not been fully regenerated, but adsorbed $NO_x$ very efficiently at intermediate temperature and could hold it until the desirable temperature was reached.

The data in FIG. 10 suggested that a mixture of Pd/BEA and Pd/FER may be advantageous to improve the overall cold-start $NO_x$ adsorption performance by retaining the high NO adsorption efficiency of Pd/BEA at low temperature while Pd/FER adsorbed $NO_x$ released by Pd/BEA at intermediate temperature.

Figure 11:
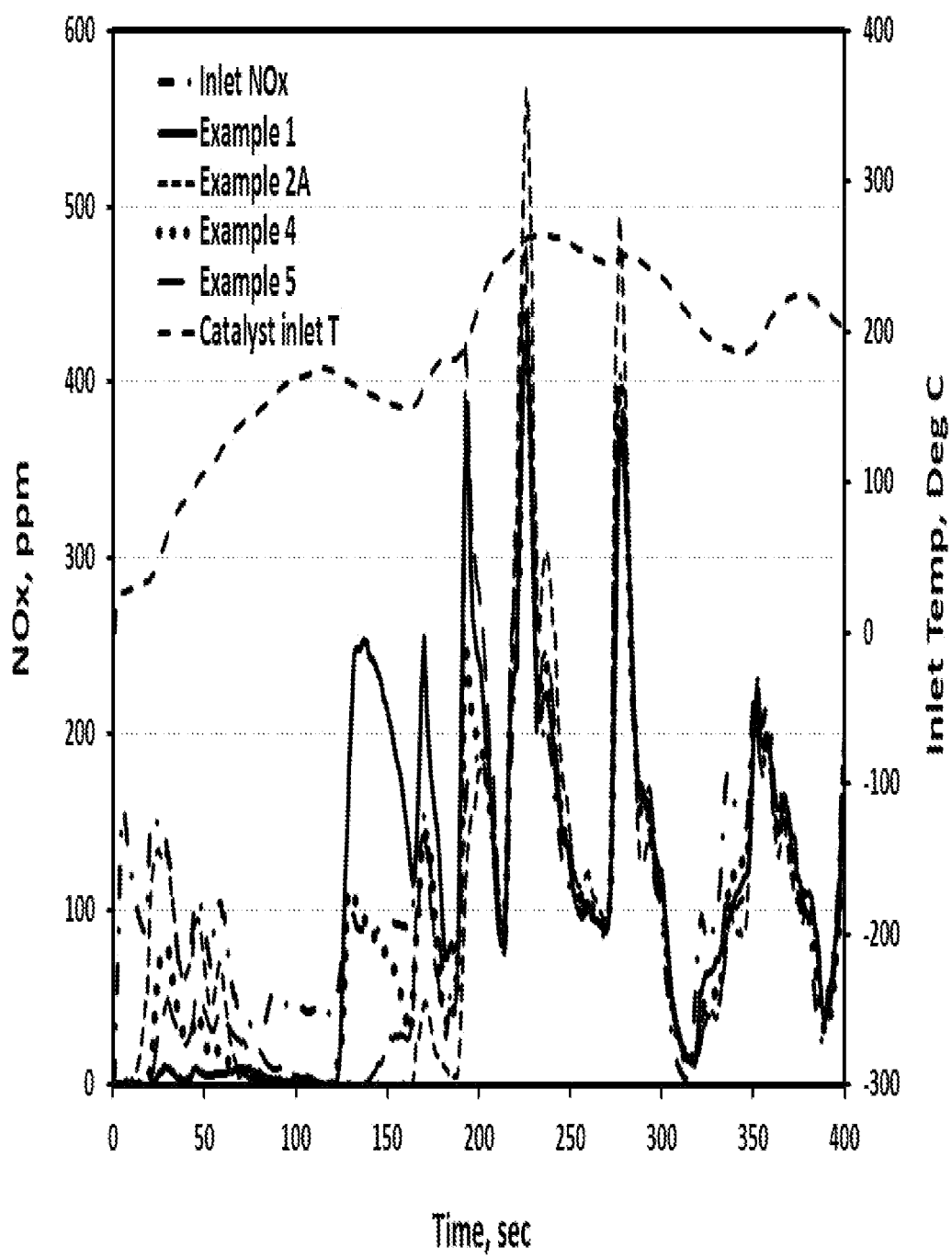
FIG. 11 is a line graph showing the catalyst outlet $NO_x$ concentration as a function of time for various catalyst composition samples.
Figure 12:
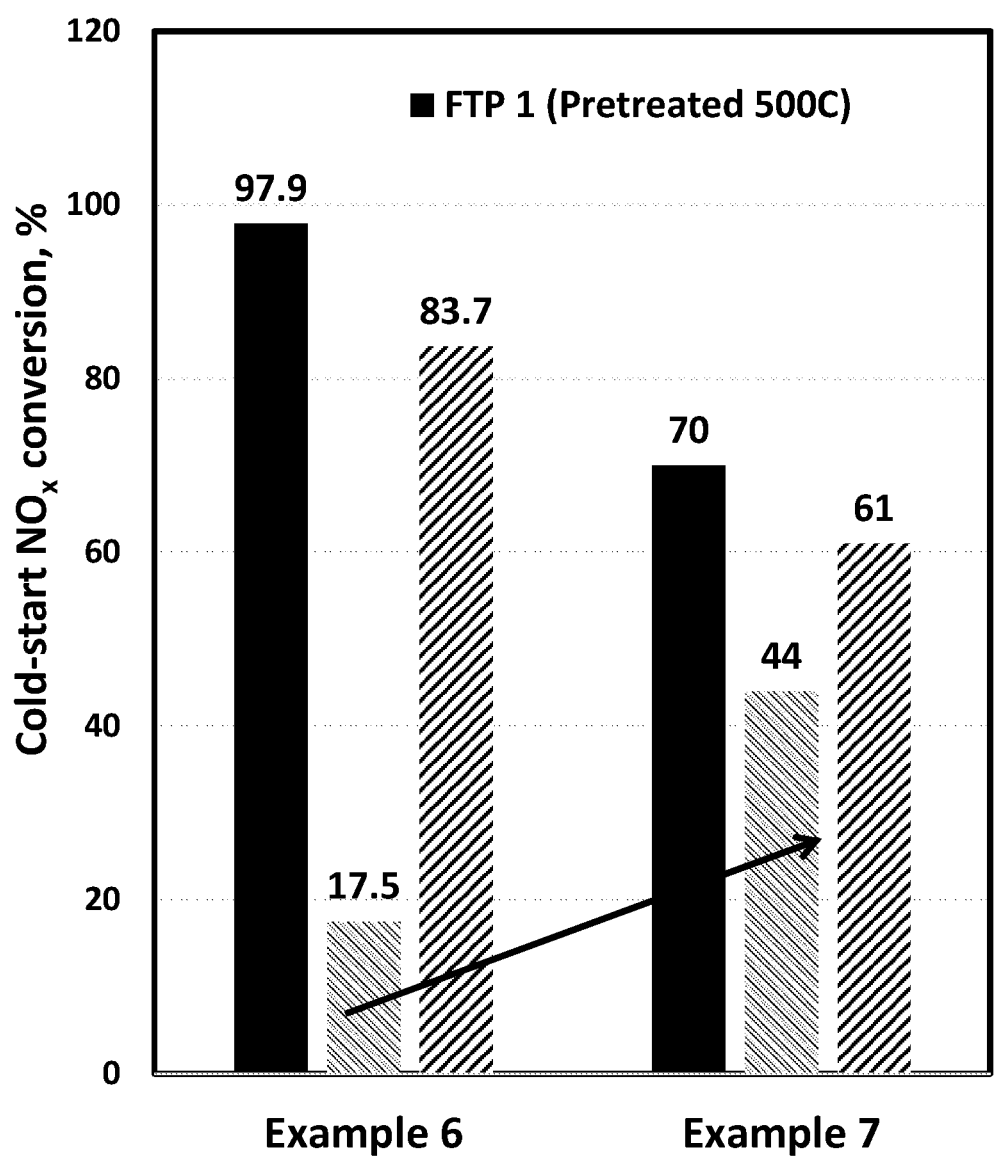
FIG. 12 is a graphical comparison of cold-start $NO_x$ adsorption efficiency over 3 FTP cycles for a LT-NA only catalyst composition and a LT-NA/DOC catalyst composition.

FIG. 11 provides data which confirms the benefit of the inventive dual Pd-zeolite components. FIG. 11 is graphical comparison of the FTP2 transient $NO_x$ concentration of a zoned Pd/BEA and Pd/FER (Example 4) and a homogenous Pd/BEA and Pd/FER mixture catalyst (Example 5) vs a Pd/BEA (Example 1) or Pd/FER-only (Example 2A) catalyst. In both cases, for the zoned and homogenous examples, NO adsorption was improved in the 20-70 second region compared to Pd/FER, and the large $NO_x$ release peak characteristic of Pd/BEA was eliminated FIG. 12 provides a graphical comparison for the cold-start (0-197 second) $NO_x$ adsorption efficiency of a 1/1 Pd/BEA & Pd/CHA mixture catalyst (Example 6), and a LT-NA/DOC combo catalyst which contained a Pd/BEA-Pd/CHA bottom coat and a Pt—Pd/$Al_2O_3$ & BEA top coat (Example 7). For FTP2, the Pd/BEA-Pd/FER catalyst demonstrated higher $NO_x$ % adsorption than the Pd/BEA-Pd/CHA catalyst due to better containment of released $NO_x$ at intermediate temperature; on the other hand, the Pd/BEA-Pd/CHA catalyst showed higher FTP3 $NO_x$ % adsorption, which suggests more efficient regeneration during the preceding US06 cycle. Furthermore, addition of a typical DOC layer seemed to significantly improve the FTP2 $NO_x$ % adsorption, despite lower Pd and zeolite loadings in the LT-NA layer.

Figure 13:
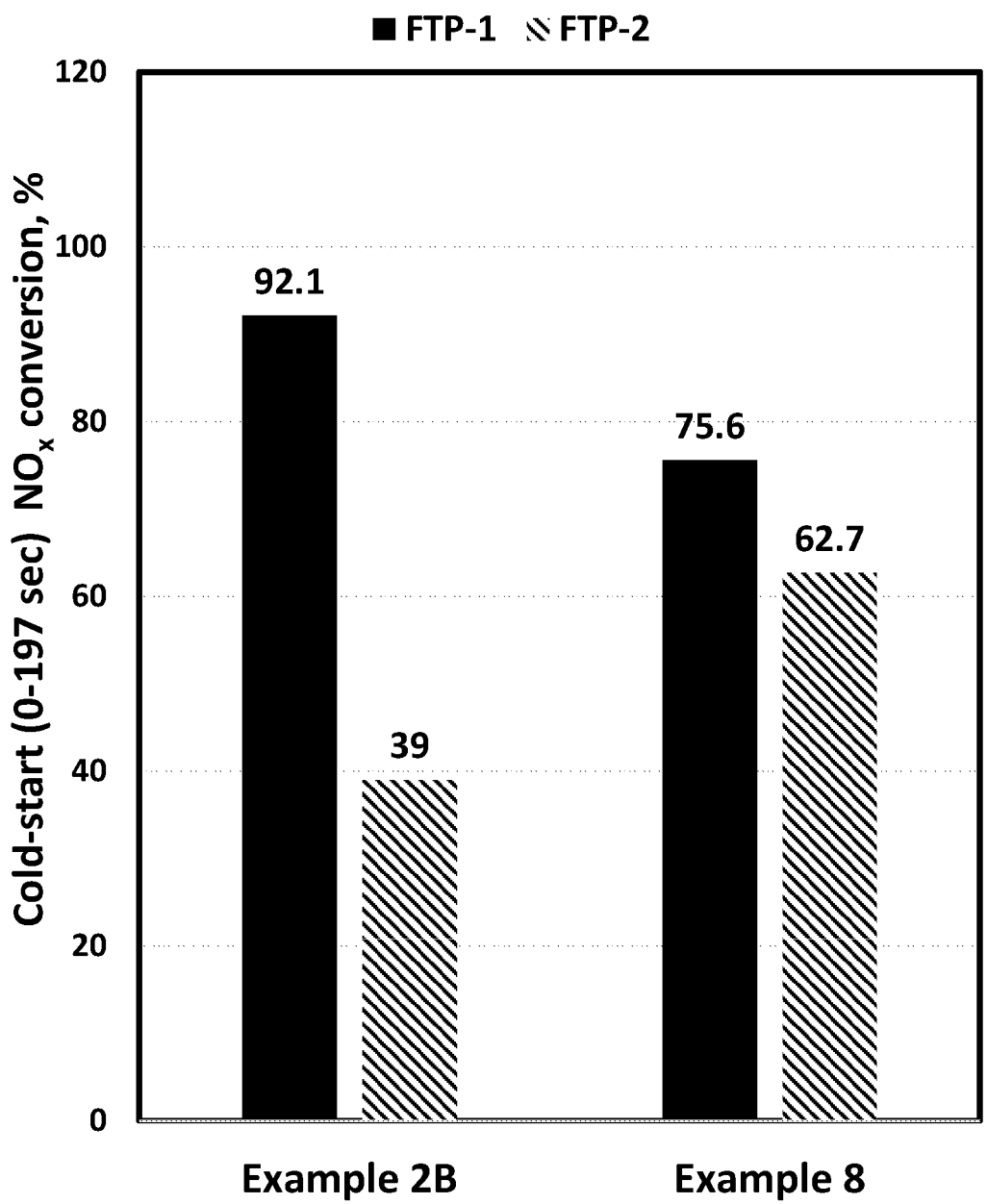
FIG. 13 is a graphical comparison of cold-start $NO_x$ adsorption efficiency for an LT-NA catalyst composition and an LT-NA/DOC catalyst composition.

FIG. 13 provides a graphical result for the cold-start (0-197 second) $NO_x$ adsorption performance for an inventive LT-NA/DOC catalytic article (Example 8) versus an inventive LT-NA article (Example 2B). Example 8 contains a lower palladium and zeolite loading in the LT-NA layer; without wishing to be bound by theory, this may contribute to lower initial $NO_x$ adsorption efficiency in the FTP1 cycle. The overlying DOC coating may also impede $NO_x$ access to the LT-NA layer in this configuration. Nevertheless, Example 8 exhibited a 13% decrease in $NO_x$ adsorption efficiency from FTP1 to FTP2, while Example 2B (Pd/BEA+Pd/FER) exhibited a 53% decrease. These results demonstrate that addition of the diesel oxidation catalyst (DOC) component significantly improved the performance in FTP2.

What is claimed is:

1. A catalyst article for treating an exhaust stream of an internal combustion engine comprising a catalyst substrate having an inlet end and an outlet end defining an overall length, and a first Low Temperature $NO_x$ Adsorber (LT-NA) catalyst composition disposed thereon, wherein the first LT-NA catalyst composition comprises:
    a first zeolite, wherein the first zeolite is a large pore zeolite and comprises a first palladium component; and
    a second zeolite, wherein the second zeolite is a small pore or medium pore zeolite and comprises a second palladium component,
    wherein the catalyst article comprises a total zeolite loading of from about 1 to about 5 g/in³.

2. The catalyst article of claim 1, wherein the first zeolite and the second zeolite are each an aluminosilicate zeolite.

3. The catalyst article of claim 1, wherein the silica-to-alumina ratio (SAR) of the first zeolite is from about 10 to about 50 and the SAR of the second zeolite is from about 10 to about 50.

4. The catalyst article of claim 1, wherein the first zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, FZU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

5. The catalyst article of claim 1, wherein the second zeolite is a small pore zeolite with a framework type selected from the group consisting of ACO, AEI, AEN, AFN, AFT, AFX, APC, APD, ATT, CDO, CHA, DDR, DFT, EAB, EDI, EPI, ERI, GIS, GOO, IHW, ITE, ITW, LEV, KFI, MER, MFI, MON, NSI, OWE, PAU, PHI, RHO, RTH, SAT, SAV, SFW, SIV, THO, TSC, UEI, UFI, VNI, YUG, ZON, and mixtures or intergrowths thereof.

6. The catalyst article of claim 1, wherein the second zeolite is a medium pore zeolite with a framework type selected from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof.

7. The catalyst article of claim 1, wherein the second zeolite has a two-dimensional pore system.

8. The catalyst article of claim 1, further comprising a third zeolite comprising a third palladium component.

9. The catalyst article of claim 8, wherein the third zeolite is a large pore zeolite, and wherein the first zeolite and the third zeolite have different framework types.

10. The catalyst article of claim 8, wherein the third zeolite is a small pore or medium pore zeolite and wherein the second zeolite and the third zeolite have different framework types.

11. The catalyst article of claim 1, wherein the first palladium component and the second palladium component are present in an amount of about 0.5% to about 6% by weight, based on the first zeolite and the second zeolite, respectively.

12. The catalyst article of claim 1, wherein the ratio by weight of the first zeolite to the second zeolite is from about 0.1:9.9 to about 9:1.

13. The catalyst article of claim 1, comprising:
    a first washcoat comprising the first zeolite disposed on at least a portion of the length of the catalyst substrate; and a second washcoat comprising the second zeolite disposed on at least a portion of the length of the catalyst substrate.

14. The catalyst article of claim 1, wherein the catalyst article comprises the first and second palladium components at a loading from about 15 to about 200 g/ft$^3$.

15. The catalyst article of claim 1, further comprising a first diesel oxidation catalyst (DOC) composition.

16. The catalyst article of claim 15, wherein the first LT-NA catalyst composition comprises a first layer and the first DOC composition comprises a second layer.

17. An exhaust gas treatment system comprising the catalytic article of claim 1, wherein the catalytic article is downstream of and in fluid communication with an internal combustion engine.

18. A method for reducing a NO$_x$ level in an exhaust gas stream from an internal combustion engine, the method comprising contacting the exhaust gas stream with the catalyst article of claim 1.

* * * * *